(12) United States Patent
Onishi

(10) Patent No.: US 8,816,960 B2
(45) Date of Patent: Aug. 26, 2014

(54) LIGHT DETECTOR, OPTICAL POSITION DETECTION APPARATUS, AND DISPLAY APPARATUS WITH POSITION DETECTION CAPABILITY

(75) Inventor: Yasunori Onishi, Shiojiri (JP)

(73) Assignee: Seiko Epson Corporation (JP)

( * ) Notice: Subject to any disclaimer, the term of this patent is extended or adjusted under 35 U.S.C. 154(b) by 352 days.

(21) Appl. No.: 12/852,709

(22) Filed: Aug. 9, 2010

(65) Prior Publication Data

US 2011/0084903 A1    Apr. 14, 2011

(30) Foreign Application Priority Data

Oct. 13, 2009   (JP) .................. 2009-235996

(51) Int. Cl.
    *G06F 3/033*   (2013.01)
    *G09G 5/08*   (2006.01)
(52) U.S. Cl.
    USPC ........... 345/157; 345/170; 345/173; 345/690; 715/856
(58) Field of Classification Search
    USPC ........... 345/157; 385/115–147; 250/216–526; 715/856–862
    See application file for complete search history.

(56) References Cited

U.S. PATENT DOCUMENTS

| | | | |
|---|---|---|---|
| 5,851,449 A | | 12/1998 | Uchino et al. |
| 2008/0266266 A1* | | 10/2008 | Kent et al. ............ 345/173 |
| 2009/0213147 A1* | | 8/2009 | Sagardoyburu et al. ...... 345/690 |
| 2009/0309838 A1* | | 12/2009 | Adan et al. ............ 345/173 |
| 2010/0164873 A1* | | 7/2010 | Senft et al. ............ 345/170 |

FOREIGN PATENT DOCUMENTS

| | | |
|---|---|---|
| JP | 03-109358 | 11/1991 |
| JP | 09-153646 | 6/1997 |

* cited by examiner

*Primary Examiner* — Gerald Johnson
(74) *Attorney, Agent, or Firm* — Harness, Dickey & Pierce, P.L.C.

(57) ABSTRACT

A light detector includes: a light receiving device having a central optical axis and first and second directions perpendicular thereto, the light receiving device detecting incident light; a first light shield provided on a light incident side of the light receiving device and disposed on one side in the first direction with respect to the light receiving device; and a second light shield provided on the light incident side of the light receiving device and disposed on the other side in the first direction with respect to the light receiving device, wherein the first and second light shields form a light incident slit over an angular range including the direction in which the central optical axis of the light receiving device extends, and the width of the slit increases as the angle with respect to the central optical axis of the light receiving device increases.

9 Claims, 16 Drawing Sheets

LIGHT DETECTOR, OPTICAL POSITION DETECTION APPARATUS, AND DISPLAY APPARATUS WITH POSITION DETECTION CAPABILITY

BACKGROUND

1. Technical Field

The present invention relates to a light detector including a light receiving device, an optical position detection apparatus including the light detector, and a display apparatus with a position detection capability including the optical position detection apparatus.

2. Related Art

A light detector including a photodiode, a phototransistor, or any other suitable light receiving device is used as a variety of sensors and optical communication receivers. A light detector with a lens in which the lens provided in front of a light receiving device increases the sensitivity has been proposed (see JP-A-09-153646).

To detect the intensity of light incident in a wide range of directions by using a light detector, the directional characteristic of sensitivity as well as the level of sensitivity needs to be considered. The light detector with a lens described in JP-A-09-153646 cannot solve the problem of the directional characteristic of sensitivity. That is, a light detector is highly sensitive to light squarely incident on the light receiving device, whereas being not very sensitive to light obliquely incident on the light detector. Therefore, when the intensity of the incident light is monitored based on a detection result from the light detector, using the light detector with a lens described in JP-A-09-153646 is problematic in that a detected value of obliquely incident light is lower than the actual value.

SUMMARY

An advantage of some aspects of the invention is to provide a light detector equally sensitive to light incident in a wide range of directions, an optical position detection apparatus using the light detector, and a display apparatus with a position detection capability including the optical position detection apparatus.

A light detector according to an aspect of the invention includes a light receiving device having a central optical axis and first and second directions perpendicular thereto, the light receiving device detecting incident light, a first light shield provided on a light incident side of the light receiving device and disposed on one side in the first direction with respect to the light receiving device, and a second light shield provided on the light incident side of the light receiving device and disposed on the other side in the first direction with respect to the light receiving device. The first and second light shields form a light incident slit over an angular range including the direction in which the central optical axis of the light receiving device extends, and the width of the slit increases as the angle with respect to the central optical axis of the light receiving device increases.

In the aspect of the invention, the light receiving device is provided with the first and second light shields, which form the light incident slit, the width of which increases as the angle with respect to the central optical axis of the light receiving device increases. As a result, even when the light receiving device has a directional characteristic of sensitivity in which the light receiving device is highly sensitive to light squarely incident thereon whereas being not very sensitive to light obliquely incident thereon, the directional characteristic of the sensitivity is canceled out by the slit. The light detector to which the invention is applied is therefore equally sensitive to the light squarely incident thereon and the light obliquely incident thereon, whereby the light detector can detect light with the same sensitivity irrespective of the direction of incident light even in a situation in which the light detector detects the intensity of light incident in a wide range of directions.

In the aspect of the invention, it is preferable that the first light shield is formed on a first holder member that holds the light receiving device on one side in the first direction, and that the second light shield is formed on a second holder member that is placed over the first holder member so that the light receiving device is sandwiched between the first and second holder members. According to the configuration described above, the light receiving device held in the holder member (first and second holder members) can conveniently be incorporated in a variety of apparatus. Further, since the first and second light shields can be formed only by changing the configuration of the first and second holder members, only a small amount of extra cost is required to improve the directional characteristic of sensitivity.

In the aspect of the invention, each of the first and second holder members is preferably made of a light shielding material. It is also preferable that the first holder member includes a first holder member-side base and a first holder member-side protrusion, the first holder member-side protrusion protruding forward with respect to the light receiving device from the first holder member-side base to form the first light shield, and that the second holder member includes a second holder member-side base and a second holder member-side protrusion, the second holder member-side base connected to the first holder member-side base and the second holder member-side protrusion protruding forward with respect to the light receiving device from the second holder member-side base to form the second light shield. The configuration described above allows the first and second holder members to be readily formed of portions to be connected to each other (first holder member-side base and second holder member-side base) and portions for forming the first and second light shields (first holder member-side protrusion and second holder member-side protrusion).

In the aspect of the invention, it is preferable that the first holder member-side protrusion, when viewed in the first direction, protrudes from the first holder member-side base and has a semi-circular shape whose center is located on the side where the light receiving device is present, and that the second holder member-side protrusion, when viewed in the first direction, protrudes from the second holder member-side base and has a semi-circular shape whose center is located on the side where the light receiving device is present. According to the configuration described above, the first holder member-side protrusion and the second holder member-side protrusion can be small in size even when a slit-shaped light incident portion is formed over an angular range including the direction in which the central optical axis of the light receiving device extends. The size of the light detector can therefore be reduced.

In the aspect of the invention, the light detector preferably further includes a lens on the light incident side of the light receiving device, the lens having a convex curved surface facing forward when viewed in the first direction. The configuration described above allows the light incident through the slit to be reliably guided to the light receiving device.

In the aspect of the invention, the optical detector may further include a light-transmissive member on the light incident side of the light receiving device, and each of the first and second light shields may be a light shielding layer formed on the light-transmissive member.

In this case, the light-transmissive member is preferably a lens having a convex curved surface facing forward when viewed in the first direction. The configuration described above allows light traveling toward the light detector to be efficiently guided to the light receiving device, whereby the sensitivity itself of the light detector can be increased.

In the aspect of the invention, the light receiving device is configured to detect, for example, at least infrared light. The thus configured light detector can be used in an optical position detection apparatus using infrared light. The optical position detection apparatus is an apparatus that optically detects the position of an object in a detection region, the optical position detection apparatus including a light source apparatus for position detection that emits infrared position detection light toward the detection region to form an intensity distribution of the position detection light in the detection region and a position detector that detects the position of the object. The light detector has a light receiving portion facing the detection region. The light receiving portion receives the position detection light reflected off the object in the detection region. The position detector detects the position of the object based on the light received by the light detector.

In the thus configured optical position detection apparatus, an intensity distribution of the position detection light is formed in the in-plain directions of the detection region, and the light detector detects the position detection light reflected off the object in the detection region. Position detection can therefore be performed without a large number of light detectors.

The optical position detection apparatus to which the invention is applied is used, for example, in a display apparatus with a position detection capability. In this case, the display apparatus with a position detection capability includes an image generation apparatus that forms an image in a region corresponding to the detection region. The display apparatus with a position detection capability to which the invention is applied is used in a mobile phone, a car navigation system, a personal computer, a ticket vending machine, an automatic teller machine in a bank, and other electronic apparatus as well as a variety of display apparatus, such as a projection display apparatus.

BRIEF DESCRIPTION OF THE DRAWINGS

The invention will be described with reference to the accompanying drawings, wherein like numbers refer to like elements.

DESCRIPTION OF EXEMPLARY EMBODIMENTS

Embodiments of the invention will be described below in detail with reference to the accompanying drawings. In the following description, let an XY plane in an XYZ orthogonal coordinate system be in-plane directions in a detection region and a Z-axis direction be the direction perpendicular to the in-plane directions in the detection region.

Figure 1A:
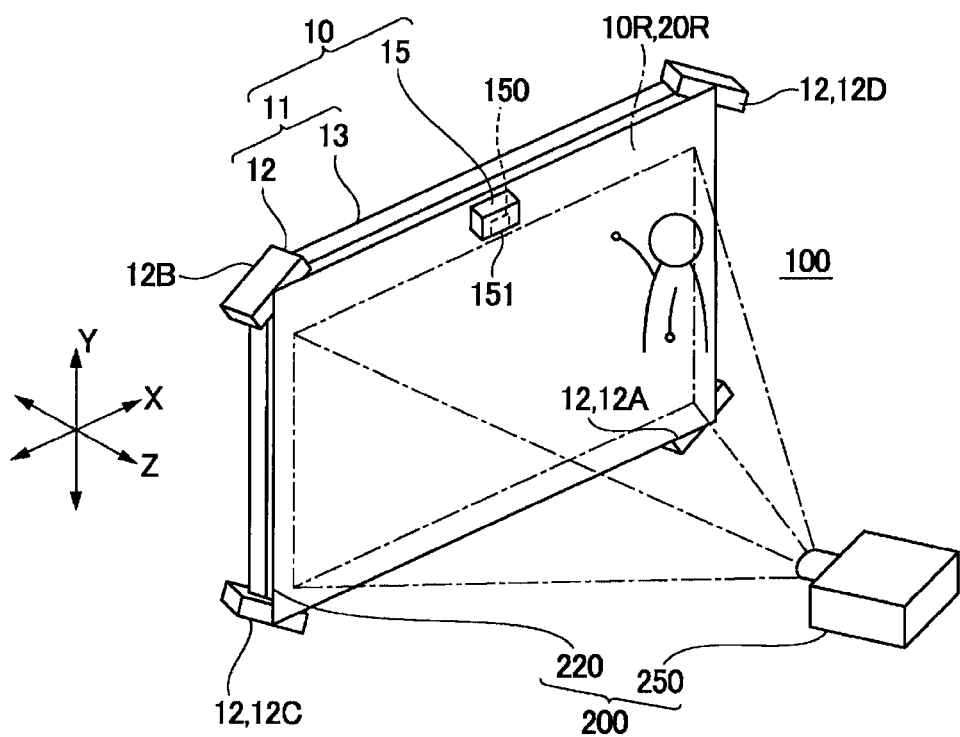
FIGS. 1A and 1B are descriptive diagrams schematically showing the configuration of a display apparatus with a position detection capability to which the invention is applied.
Figure 1B:
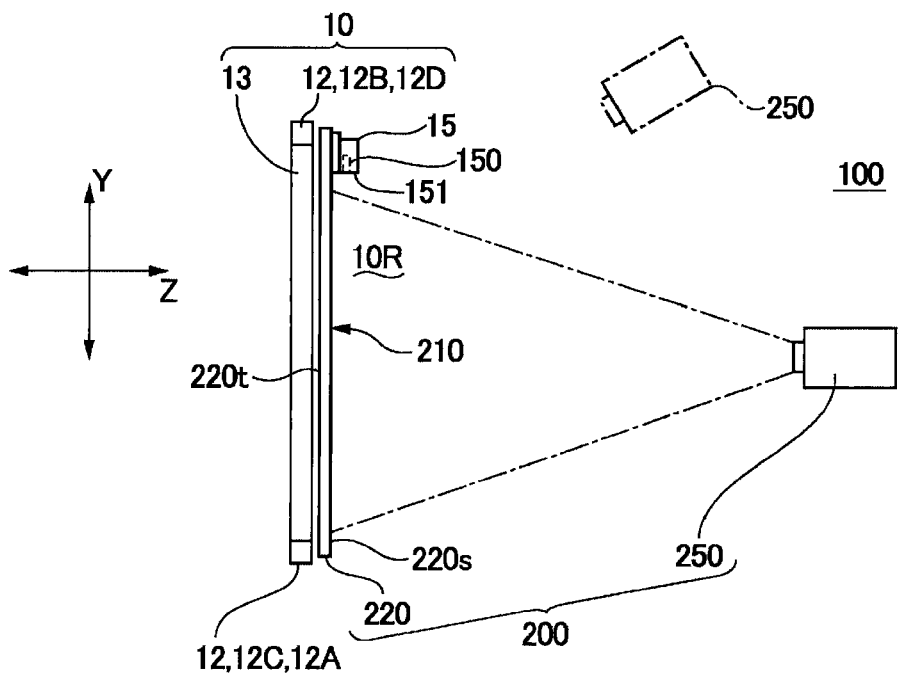

Configurations of Optical Position Detection Apparatus and Display Apparatus with Position Detection Capability
Overall Configuration of Display Apparatus with Position Detection Capability FIGS. 1A and 1B are descriptive diagrams schematically showing the configuration of a display apparatus with a position detection capability to which the invention is applied. FIG. 1A is a descriptive diagram schematically showing a key portion of the display apparatus with a position detection capability viewed obliquely downward, and FIG. 1B is a descriptive diagram schematically showing the key portion of the display apparatus with a position detection capability viewed sideways.

The display apparatus 100 with a position detection capability shown in FIGS. 1A and 1B includes an optical position detection apparatus 10 and an image generation apparatus 200. The optical position detection apparatus 10 detects the in-plane position (X-coordinate position and Y-coordinate position) of an object Ob when the object, such as a finger, approaches a detection region 10R in response to an image displayed by the image generation apparatus 200.

As will be described later in detail, the optical position detection apparatus 10 includes a light source apparatus 11 for position detection formed of a plurality of light sources 12 for position detection, each of which emits infrared position detection light, and a light detector 15 with alight receiving portion 151 facing the detection region 10R. In the present embodiment, the light source apparatus 11 for position detection further includes a light guide plate 13 disposed in parallel to the XY plane. The light detector 15 includes a light receiving device 150, such as a photodiode and a phototransistor.

In the present embodiment, the image generation apparatus 200 is based on light projection and includes a screen member 220 placed over the front side (input operation side) of the light guide plate 13 and an image projection apparatus 250 that enlarges and projects display light on one surface 220s of the screen member 220. The image generation apparatus 200 has an image display region 20R on the screen member 220. The detection region 10R of the optical position detection apparatus 10 is located in a space facing the one surface 220s, which faces the image projection apparatus 250, of the screen member 220, and the light source apparatus 11 for position detection formed of the light guide plate 13 and the light sources 12 for position detection is disposed in a space facing the other surface 220t of the screen member 220. In the present embodiment, the image display region 20R substantially overlaps with the detection region 10R.

In the present embodiment, the screen member 220 can be any of the following members, each of which is made of a material capable of transmitting infrared light: First of all, the screen member 220 can be a white screen made of a fabric on which a white paint is applied or an embossed white vinyl material. The screen member 220 can alternatively be a silver screen colored in a strong silver to increase optical reflectance. Still alternatively, the screen member 220 can be a pearl screen obtained by coating a resin on a surface of a fabric to increase the optical reflectance or a piece screen on which fine glass powder is applied to increase the optical reflectance. The screen member 220 is configured as a manually suspended screen with a light receiving device or an electrically driven screen with a light receiving device.

FIGS. 1A and 1B show a case where the image projection apparatus 250 squarely faces the screen member 220. The image projection apparatus 250 alternatively projects display light obliquely toward the screen member 220 in some cases, as indicated by the dashed line in FIG. 1B.

Basic Configuration of Optical Position Detection Apparatus 10

Figure 2:
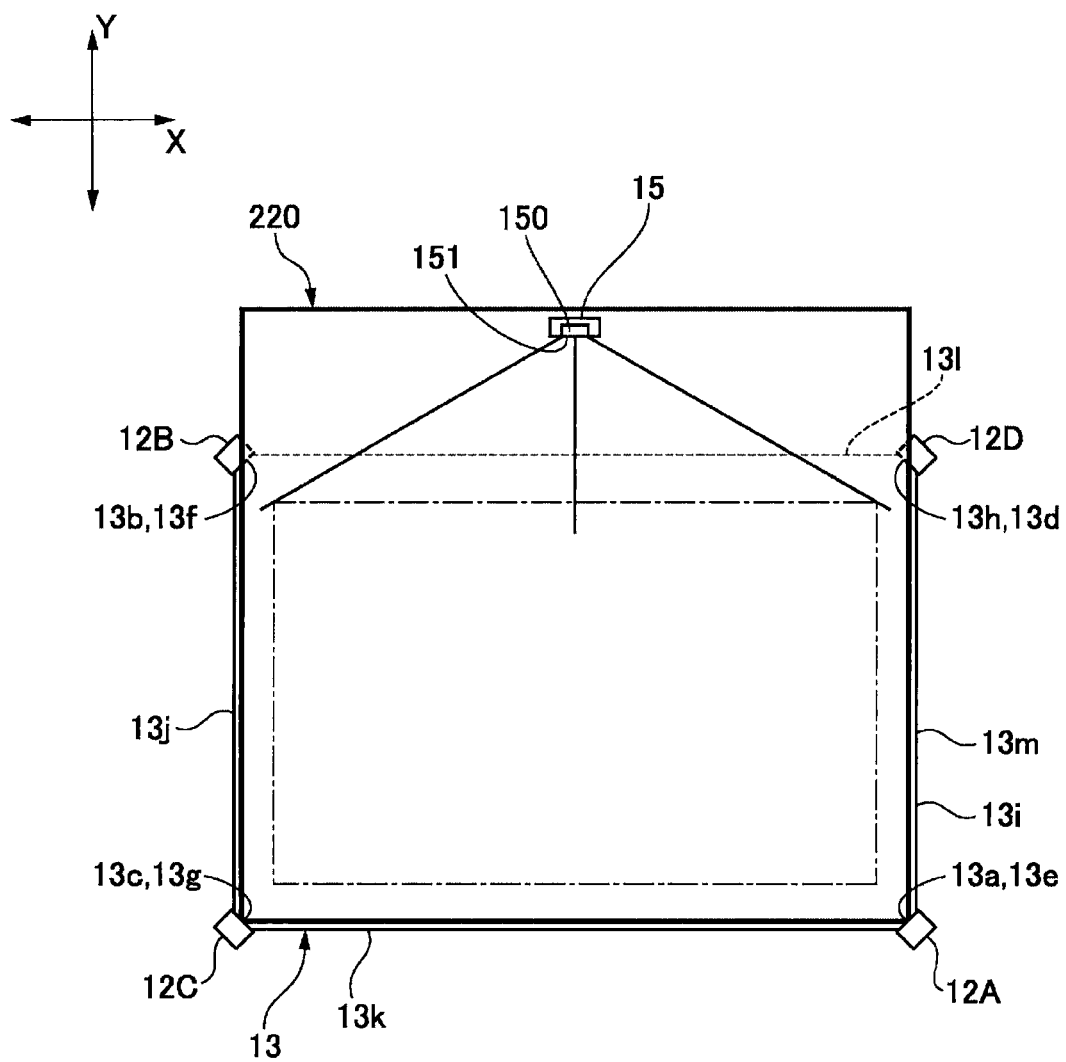
FIG. 2 is a descriptive diagram schematically showing the display apparatus with a position detection capability, to which the invention is applied, viewed in the direction perpendicular to a screen member.
Figure 3A:
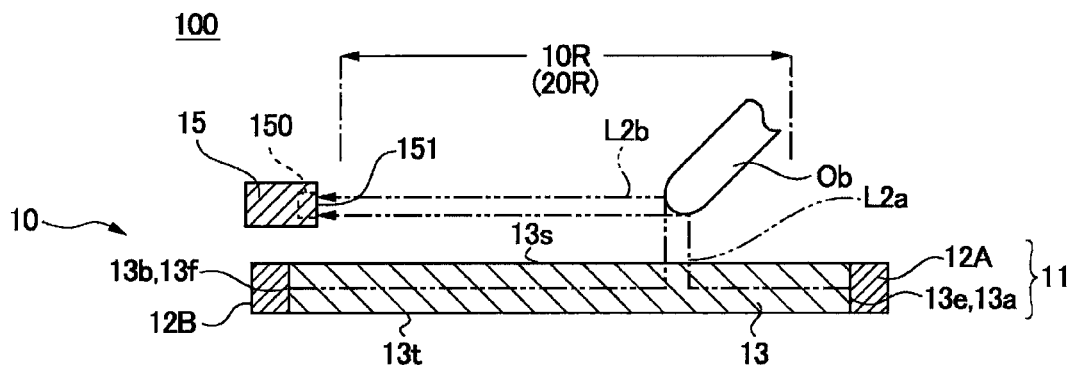
FIGS. 3A to 3C are descriptive diagrams showing a basic configuration of an optical position detection apparatus to which the invention is applied.
Figure 3B:
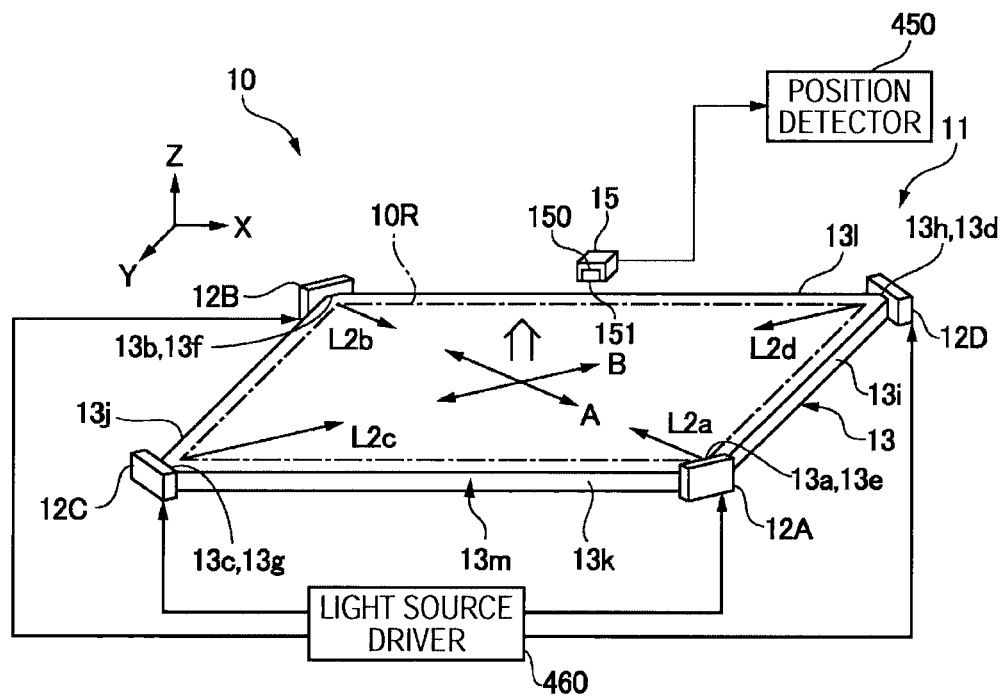
Figure 3C:
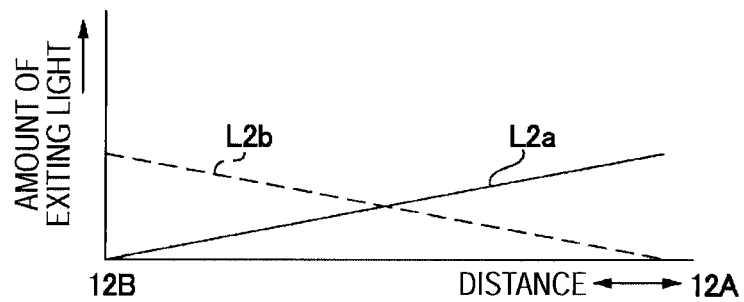

FIG. 2 is a descriptive diagram schematically showing the display apparatus with a position detection capability, to which the invention is applied, viewed in the direction perpendicular to the screen member. FIGS. 3A to 3C are descriptive diagrams showing a basic configuration of the optical position detection apparatus 10 to which the invention is applied. FIG. 3A is a descriptive diagram schematically showing a cross-sectional configuration of the optical position detection apparatus 10. FIG. 3B is a descriptive diagram showing the configuration of the light guide plate 13 and other components used in the optical position detection apparatus. FIG. 3C is a descriptive diagram showing how the infrared position detection light is attenuated in the light guide plate 13. In FIG. 3A, the vertical direction corresponds to the Z-axis direction.

As shown in FIGS. 2, 3A, and 3B, in the optical position detection apparatus 10 of the present embodiment, the light source apparatus 11 for position detection includes the light guide plate 13 having a substantially oblong flat shape. A side end surface 13m of the light guide plate 13 is formed of side portions 13k and 13l corresponding to longer sides and side portions 13i and 13j corresponding to shorter sides. The side portions 13k and 13l face each other in the Y-axis direction, the side portions 13i and 13j face each other in the X-axis direction. In accordance with the shape of the light guide plate 13, the optical position detection apparatus 10 includes four light sources 12A to 12D for position detection (light sources 12 for position detection shown in FIGS. 1A and 1B) that emit position detection light fluxes L2a to L2d. Four light incident portions 13a to 13d on which the position detection light fluxes L2a to L2d are incident are provided on the side end surface 13m of the light guide plate 13. One surface (upper surface in FIG. 3A) of the light guide plate 13 is a light exiting surface 13s through which the position detection light fluxes L2a to L2d having propagated in the light guide plate 13 exit, and the light exiting surface 13s is perpendicular to the side end surface 13m. The optical position detection apparatus 10 includes the light detector 15 with the light receiving portion 151 facing the detection region 10R.

In the present embodiment, the four light sources 12A to 12D for position detection and the four light incident portions 13a to 13d are disposed at corner portions 13e, 13f, 13g, and 13h of the light guide plate 13, respectively. The light sources 12A to 12D for position detection face the light incident portions 13a to 13d or are preferably in close contact with the light incident portions 13a to 13d.

The light guide plate 13 is formed of a transparent resin plate made, for example, of a polycarbonate or acrylic resin. In the light guide plate 13, an indented surface structure, a prism structure, a scattering layer, or any other suitable structure (not shown) is provided on the light exiting surface 13s or a rear surface 13t facing away from the light exiting surface 13s, and any of the light scattering structures causes the light fluxes introduced through the light incident portions 13a to 13d and propagating in the light guide plate 13 to be gradually deflected as the light fluxes travel in their propagating direction and exit through the light exiting surface 13s. A prism sheet, a light scattering plate, or any other suitable optical sheet is disposed as required in some cases on the light exiting side of the light guide plate 13 in order to homogenize the position detection light fluxes L2a to L2d.

Each of the light sources 12A to 12D for position detection is formed of an LED (Light Emitting Diode) or any other suitable light emitting device, and the light sources 12A to 12D for position detection emit divergent infrared light fluxes L2a to L2d for position detection in response to drive signals outputted from a drive circuit (not shown). The position detection light fluxes L2a to L2d are not particularly limited to a specific type of light but may be any type of light having a different light emission mode in a sense that the wavelength distribution of each of the light fluxes differs from the wavelength distribution of visible light or each of the light fluxes can be modulated into, for example, a blinking light flux. Further, the position detection light fluxes L2a to L2d preferably belong to a wavelength range that causes the light fluxes to be efficiently reflected off the object Ob, such as a finger or a touch pen. When the object Ob is a finger or any other part of the human body, it is desirable to use infrared light well reflected off the surface of the human body (in particular, near-infrared light close to the visible light range, for example, having a wavelength of 850 nm or therearound or infrared light having a wavelength of 950 nm).

The number of light sources 12A to 12D for position detection is essentially two or more, and the position detection light fluxes L2a to L2d are emitted from the light sources 12A to 12D for position detection located in different positions. Among the four light sources 12A to 12D for position detection, two light sources for position detection located along a diagonal are paired to form a first light source, and the other two light sources for position detection are paired to form a second light source. Alternatively, among the four light sources 12A to 12D for position detection, two adjacent light sources for position detection are paired to form a first light source pair, and the other two light sources for position detection are paired to form a second light source pair in some cases.

The detection region 10R is a planar region on the viewer's side (operator's side) to which the position detection light fluxes L2a to L2d exit and where the object Ob can produce reflected light. In the present embodiment, the detection region 10R has a rectangular planar shape, and the light detector 15 is disposed in a substantially longitudinally central portion of one of the four side portions. In the detection region 10R, the interior angle of a corner portion formed of two adjacent sides is 90 degrees, which is the same as the size of the interior angle of each of the corner portions 13e to 13h of the light guide plate 13. The light detector may alternatively be disposed in a side portion corresponding to a shorter side.

As shown in FIG. 3B, in the display apparatus 100 with a position detection capability of the present embodiment, a light source driver 460 is provided to drive the four light sources 12A to 12D for position detection, and a position detector 450 is provided to control the light detector 15.

In the thus configured display apparatus 100 with a position detection capability, the position detection light fluxes L2a and L2b propagate through the interior of the light guide plate 13 in opposite directions indicated by the arrow A and exit through the light exiting surface 13s. Similarly, the position detection light fluxes L2c and L2d propagate in opposite directions (directions indicated by the arrow B) that intersect the directions indicated by the arrow A and exit through the light exiting surface 13s. The amount of position detection light flux L2a having exited from the light guide plate 13 into the detection region 10R is linearly attenuated as the distance from the light source 12A for position detection and is expressed by the corresponding intensity distribution indicated by the solid line shown in FIG. 3C. Similarly, the position detection light flux L2b having exited into the detection region 10R is linearly attenuated as the distance from the light source 12B for position detection and is expressed by the corresponding intensity distribution indicated by the dotted line shown in FIG. 3C.

Fundamental Principle According to which XY Coordinates are Detected

A description will be made of a method for acquiring the XY coordinates of the object Ob based on the detection result from the light detector 15. There are a variety of conceivable examples of the method for acquiring the positional information. For example, the position detector 450 determines the ratio between the coefficients at which two position detection light fluxes are attenuated based on the ratio between the amounts of the two detected light fluxes and determines the propagating distances of the two position detection light fluxes based on the attenuation coefficient ratio so as to determine the position coordinates along the line connecting the corresponding two light sources. Alternatively, the position detector 450 determines the difference between the amounts of two detected position detection light fluxes and uses the difference to determine the position coordinates along the line connecting the corresponding two light sources. In each of the methods described above, any of the following methods can be used: a method in which output values from the light detector 15 are directly used in the position detection calculation and a method in which a capacitor is charged or discharged via the light detector 15 and the period having elapsed until the voltage across the capacitor reaches a predetermined voltage is used in the position detection calculation. In either case, the characteristics described below are used.

First, in the display apparatus 100 with a position detection capability, the position detection light fluxes L2a to L2d emitted from the light sources 12A to 12D for position detection are introduced through the light incident portions 13a to 13d into the light guide plate 13, propagate through the interior of the light guide plate 13, and gradually exit through the light exiting surface 13s. As a result, the position detection light fluxes L2a to L2d radiated through the light exiting surface 13s spread two-dimensionally.

For example, the position detection light flux L2a gradually exits through the light exiting surface 13s while propagating from the light incident portion 13a through the interior of the light guide plate 13 toward the light incident portion 13b. Similarly, the position detection light fluxes L2c and L2d gradually exit through the light exiting surface 13s while propagating through the interior of the light guide plate 13. When the object Ob, such as a finger, is then placed in the detection region 10R, the object Ob reflects the position detection light fluxes L2a to L2d, and part of the reflected light is detected by the light detector 15.

It is considered in this process that the amount of position detection light flux L2a, which will exit into the detection region 10R, is linearly attenuated as the distance from the light source 12A for position detection, as indicated by the solid line shown in FIG. 3C, and that the amount of position detection light flux L2b, which will exit into the detection region 10R, is linearly attenuated as the distance from the light source 12B for position detection, as indicated by the dotted line shown in FIG. 3C.

Now, let Ia be the amount by which the light source 12A for position detection is controlled (the amount of current, for example), k be a conversion coefficient, and Ea be the amount of emitted light. Similarly, let Ib be the amount by which the light source 12B for position detection is controlled (the amount of current), k be the conversion coefficient, and Eb be the amount of emitted light. The parameters described above satisfy the following equations.

$$Ea = k \times Ia$$

$$Eb = k \times Ib$$

Further, let fa be the coefficient at which the position detection light L2a is attenuated and Ga be the amount of detected light L2a. Similarly, let fb be the coefficient at which the position detection light L2b is attenuated and Gb be the amount of detected light L2b. The parameters described above satisfy the following equations.

$$Ga = fa \times Ea = fa \times k \times Ia$$

$$Gb = fb \times Eb = fb \times k \times Ib$$

Therefore, the ratio between the amounts of detected position detection light fluxes L2a and L2b, Ga/Gb, which can be detected by the light detector 15, is expressed as follows.

$$Ga/Gb = (fa \times Ea)/(fb \times Eb) = (fa/fb) \times (Ia/Ib)$$

When the values corresponding to the ratio between the amounts of emitted light Ea/Eb and the ratio between the amounts of control Ia/Ib are known, the ratio between the attenuation coefficients fa/fb is determined. Provided that the ratio between the attenuation coefficients linearly changes with the ratio between the propagation distances of the position detection light fluxes L2a and L2b, the positional information on the object Ob can be obtained by setting the linear relationship in advance.

To determine the attenuation coefficient ratio fa/fb described above, for example, the light sources 12A and 12B for position detection are driven in such a way that they blink in opposite phases (for example, by providing rectangular-wave or sinusoidal-wave drive signals that are out of phase by 180 degrees and have frequencies that allow the phase difference due to the difference in propagating distance to be neglected), and then the waveforms of the detected light fluxes are analyzed. More realistically, for example, the amount of control Ia, which is one of the amounts of control, is fixed (Ia=Im) and the other amount of control Ib is controlled in such a way that no detected waveform is observable, that is, the ratio between the amounts of detected light fluxes Ga/Gb is one. The amount of control Ib=Im×(fa/fb) is used to derive the attenuation coefficient ratio fa/fb.

Alternatively, the control may be performed in such a way that the sum of the amounts of control is always fixed, that is, the following equation is satisfied.

$$Im=Ia+Ib$$

In this case, since the following equation is satisfied:

$$Ib=Im\times fa/(fa+fb),$$

the attenuation coefficient ratio is determined by the following equation:

$$fa/fb=a/(1-a)$$

where $fa/(fa+fb)=\alpha$.

As described above, the positional information on the object Ob in the direction indicated by the arrow A can be acquired by driving the light sources 12A and 12B for position detection in opposite phases. Similarly, the positional information on the object Ob in the direction indicated by the arrow B can be acquired by driving the light sources 12C and 12D for position detection in opposite phases. The position coordinates of the object Ob in the XY plane can therefore be acquired by sequentially carrying out the detection operation in the direction A and the detection operation in the direction B in the control system described above.

To acquire in-plane positional information in the detection region 10R on the object Ob based on the ratio between the amounts of position detection light fluxes detected by the light detector 15 as described above, for example, the following configuration can be employed: A microprocessor unit (MPU) is used as the position detector 450 to execute predetermined software (action program) corresponding to the process described above. Alternatively, the position detector 450 includes a logic circuit or any other similar hardware corresponding to the process described above. The position detector 450 described above may be incorporated as part of the display apparatus 100 with a position detection capability or may be disposed in an electronic apparatus in which the display apparatus 100 with a position detection capability is incorporated.

Detection Method in Present Embodiment

In the optical position detection apparatus 10 of the present embodiment, the X-coordinate position of the object Ob in the detection region 10R is detected by driving the light sources 12A and 12D for position detection in the same phase, driving the light sources 12B and 12C for position detection in the same phase, and driving the light sources 12A, 12D for position detection and the light sources 12B, 12C for position detection in opposite phases. That is, the light source driver 460 alternately sets a first period for X coordinate detection and a second period for X coordinate detection. In the first period for X coordinate detection, the light source driver 460 turns on the light sources 12A and 12D for position detection and turns off the light sources 12B and 12C for position detection so as to form an intensity distribution whose value increases toward one side in the X-axis direction, and in the second period for X coordinate detection, the light source driver 460 turns on the light sources 12B and 12C for position detection and turns off the light sources 12A and 12D for position detection so as to form an intensity distribution whose value increases toward the other side in the X-axis direction. The position detector 450 can therefore detect the X coordinate of the object Ob in the detection region 10R by using the ratio or difference between the detected value from the light detector 15 in the first period for X coordinate detection and the detected value from the light detector 15 in the second period for X coordinate detection.

Similarly, the Y-coordinate position of the object Ob in the detection region 10R is detected by driving the light sources 12A and 12C for position detection in the same phase, driving the light sources 12B and 12D for position detection in the same phase, and driving the light sources 12A, 12C for position detection and the light sources 12B, 12D for position detection in opposite phases. That is, the light source driver 460 alternately sets a first period for Y coordinate detection and a second period for Y coordinate detection. In the first period for Y coordinate detection, the light source driver 460 turns on the light sources 12A and 12C for position detection and turns off the light sources 12B and 12D for position detection so as to form an intensity distribution whose value increases toward one side in the Y-axis direction, and in the second period for Y coordinate detection, the light source driver 460 turns on the light sources 12B and 12D for position detection and turns off the light sources 12A and 12C for position detection so as to form an intensity distribution whose value increases toward the other side in the Y-axis direction. The position detector 450 can therefore detect the Y coordinate of the object Ob in the detection region 10R by using the ratio or difference between the detected value from the light detector 15 in the first period for Y coordinate detection and the detected value from the light detector 15 in the second period for Y coordinate detection.

The Z coordinate may also be detected by simultaneously turning on the four light sources 12A to 12D for position detection to form intensity distributions of the position detection light fluxes in the Z-axis direction.

Detailed Configuration of Optical Position Detection Apparatus 10

Figure 4:
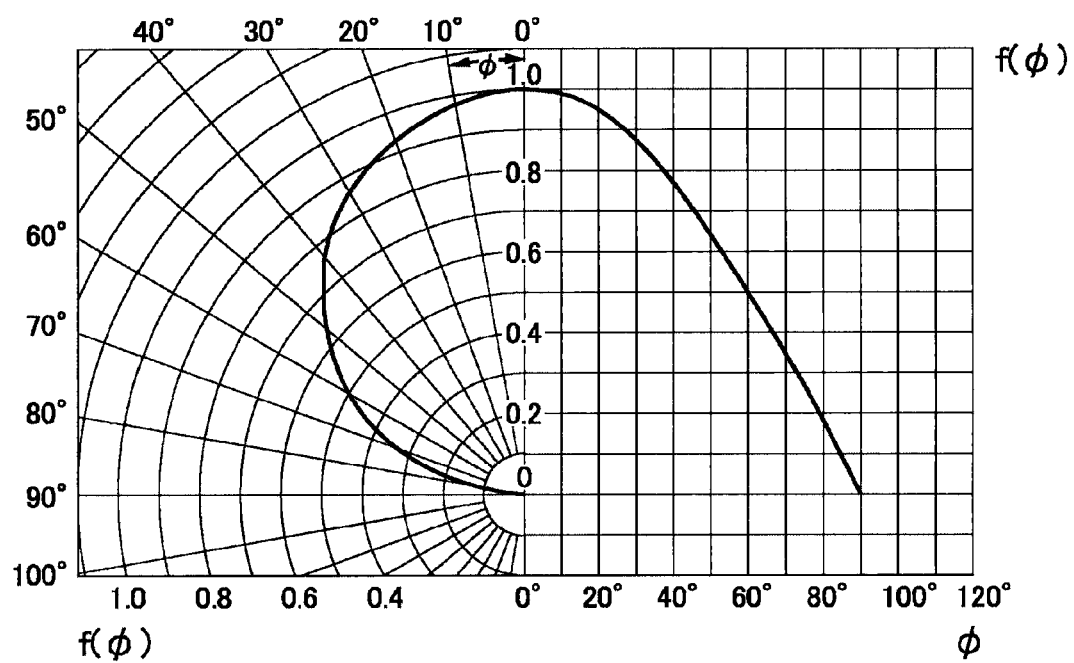
FIG. 4 is a descriptive diagram showing a directional characteristic of the sensitivity of a photodiode used in a light detector in the optical position detection apparatus to which the invention is applied.
Figure 5A:
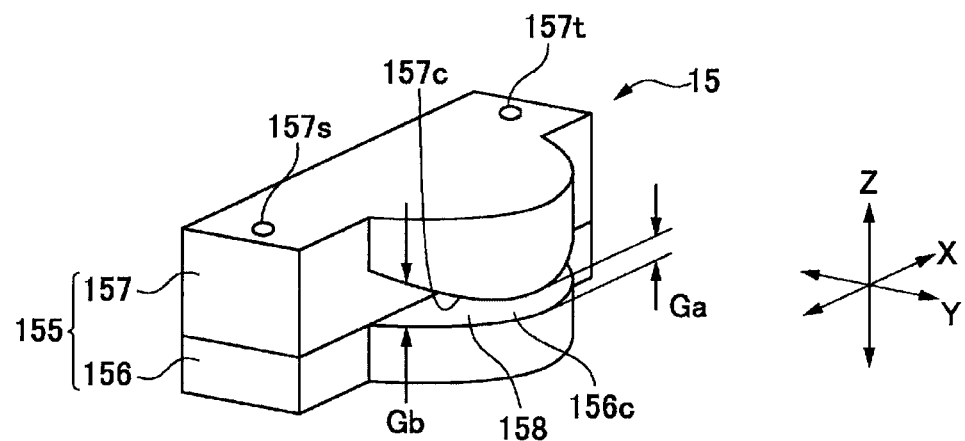
FIGS. 5A and 5B are descriptive diagrams of the light detector used in the optical position detection apparatus to which the invention is applied.
Figure 5B:
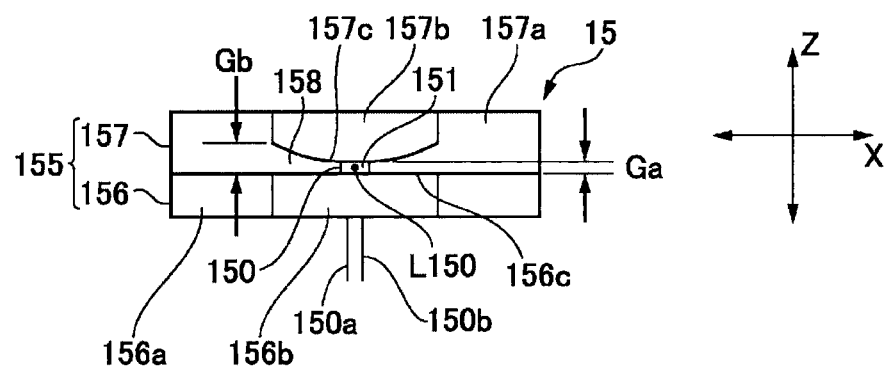
Figure 6A:
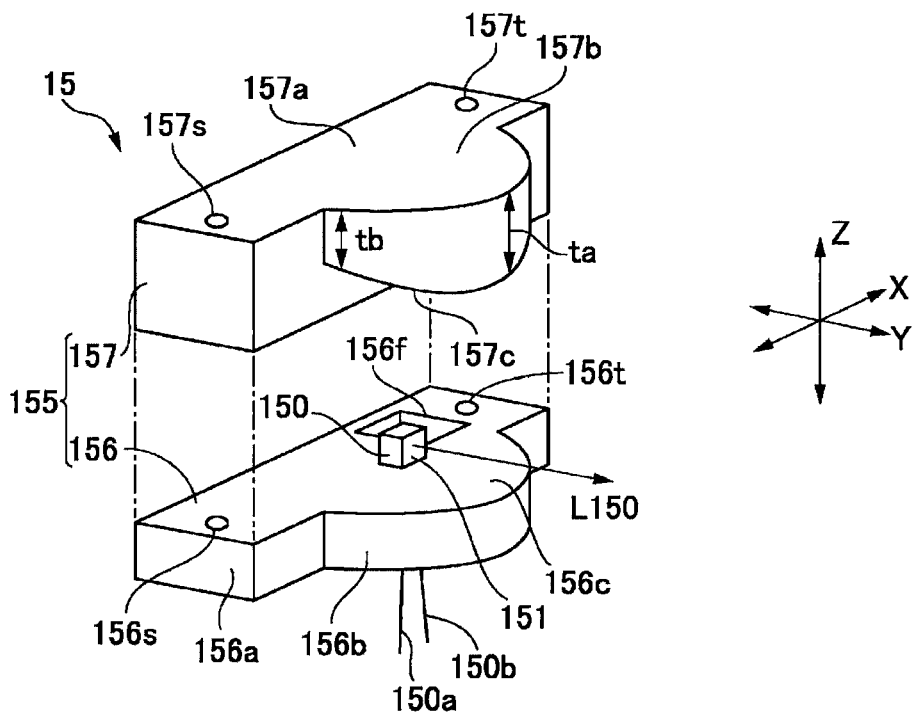
FIGS. 6A and 6B are exploded perspective views of the light detector shown in FIGS. 5A and 5B.
Figure 6B:
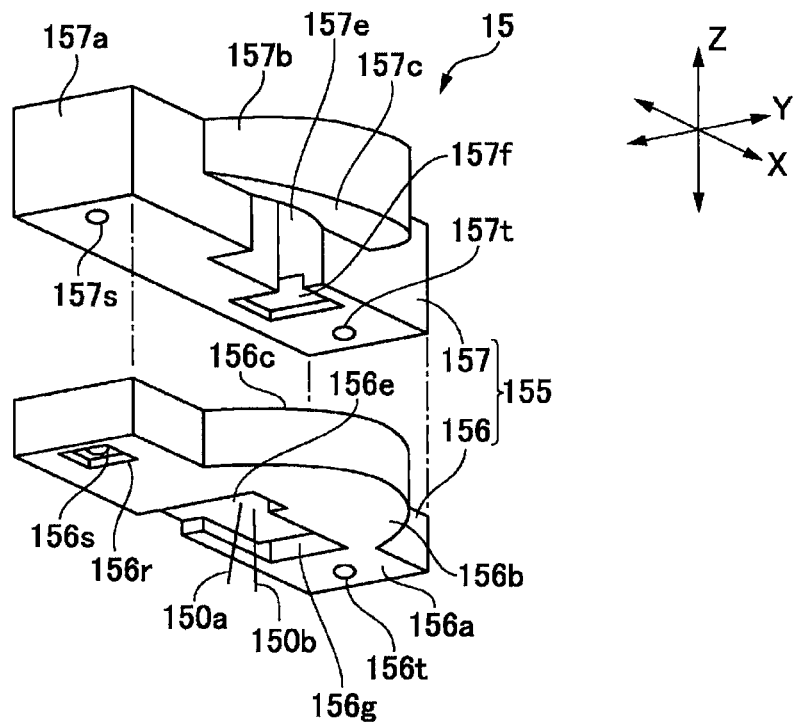

FIG. 4 is a descriptive diagram showing a directional characteristic of the sensitivity of a photodiode used in the light detector 15 in the optical position detection apparatus 10 to which the invention is applied. FIGS. 5A and 5B are descriptive diagrams of the light detector 15 used in the optical position detection apparatus to which the invention is applied. FIG. 5A is a perspective view of the light detector 15, and FIG. 5B is a front view of the light detector 15. FIGS. 6A and 6B are exploded perspective views of the light detector 15 shown in FIGS. 5A and 5B. FIG. 6A is an exploded perspective view of the light detector 15 viewed obliquely downward, and FIG. 6B is an exploded perspective view of the light detector 15 viewed obliquely upward.

The light detector 15 shown in FIGS. 1A, 1B, 2, and 3A to 3C include a photodiode as the light receiving device 150, and the photodiode has the directional characteristic of the sensitivity shown in FIG. 4. FIG. 4 shows the relationship between an angle $\Phi$ with respect to a central optical axis of the light detector 15 and the sensitivity f(Φ) thereof. In FIG. 4, the sensitivity f(Φ) at the central optical axis (on the front side) of the light detector 15 is set at 1.0. As shown in FIG. 4, the sensitivity f(Φ) of the light receiving device 150 has a peak at the central optical axis (on the front side), decreases as the angle Φ with respect to the central optical axis of the light detector 15 increases, and reaches zero at 90 degrees with respect to the central optical axis. The sensitivity f(Φ) is at least 0.87 when the angle f(Φ) on each side with respect to the central optical axis of the light receiving device 150 is 30 degrees or smaller (total angular range of 60 degrees corresponding to both sides of the central optical axis), and the position detection described with reference to FIGS. 3A to 3C can be precisely performed in this high-sensitivity angular range. When the angle Φ on each side with respect to the central optical axis of the light receiving device 150 is 60 degrees or smaller (total angular range of 120 degrees corresponding to both sides of the central optical axis), the sensitivity f(Φ) is at least 0.50, and the position detection described with reference to FIGS. 3A to 3C can also be adequately performed in this high-sensitivity angular range. On the other hand, when the angle Φ on each side with respect to the central optical axis of the light detector 15 is greater than 60 degrees, the sensitivity f(Φ) decreases and the detection accuracy increases in the angular range described above.

In the present embodiment, the position detection is performed based on the amount of light received within the high-sensitivity angular range (60 degrees on each side) of the light detector 15 in accordance with the directional characteristic of the sensitivity shown in FIG. 4. As seen from FIG. 4, however, the sensitivity f(Φ) varies within a range of 1 to 0.5 even within the high-sensitivity angular range.

To address the problem, the light detector 15 in the present embodiment is formed of the light receiving device 150 and a holder member 155, as shown in FIGS. 5A and 5B and FIGS. 6A and 6B, and the holder member 155 is used as a directional characteristic adjustment member to reduce the difference between the amount of incident light at the central optical axis L150 of the light receiving device 150 and the amount of incident light at a point angularly spaced apart from the central optical axis L150.

In the present embodiment, the holder member 155 includes a first holder member 156 formed of a black resin molded part disposed on one side in the Z-axis direction with respect to the light receiving device 150 and a second holder member 157 formed of a black resin molded part disposed on the other side in the Z-axis direction with respect to the light receiving device 150, so that the light receiving device 150 is sandwiched between the first holder member 156 and the second holder member 157. The holder member 155 (first holder member 156 and second holder member 157) makes an opening through which light is incident on the light receiving device 150 at the central optical axis L150 thereof narrower than an opening through which light is incident on the light receiving device 150 at a point angularly spaced apart from the central optical axis L150.

More specifically, the holder member 155 has a slit 158 as a light incident opening formed by the first holder member 156 and the second holder member 157 and extending in the circumferential direction on both sides of the central optical axis L150 of the light receiving device 150, as shown in FIGS. 5A and 5B. The width of the slit 158 increases as the angular distance from the central optical axis L150 of the light receiving device 150 increases.

As shown in FIGS. 5A and 5B and FIGS. 6A and 6B, to form the holder member 155 in the present embodiment, the first holder member 156 has a substantially box-shaped base 156*a* that holds two lead wires 150*a* and 150*b* of the light receiving device 150 (first holder member-side base) and a semi-circular, light shielding protrusion 156*b* protruding forward from the front side of the base 156*a* (first holder member-side protrusion/first light shield). The second holder member 157 has a substantially box-shaped base 157*a* (second holder member-side base) and a semi-circular, light shielding protrusion 157*b* protruding forward from the front side of the base 157*a* (second holder member-side protrusion/second light shield), as in the case of the first holder member 156. Each of the light shielding protrusions 156*b* and 157*b*, when viewed in the Z-axis direction, has a semi-circular shape having its center on the side where the light receiving device 150 is present.

In the light detector 15 of the present embodiment, the light receiving device 150 is held on the base 156*a* of the first holder member 156 and protrudes toward the second holder member 157, which is placed over the first holder member 156. A recess 157*e* is formed in the portion of the second holder member 157 where the light receiving device 150 otherwise interferes with the second holder member 157, and the front side of the recess 157*e* is open. As a result, the second holder member 157 can be placed over the first holder member 156 in such a way that the base 157*a* is placed over and comes into contact with the base 156*a*, and the light receiving portion 151 of the light receiving device 150 is exposed to the outside through the recess 157*e* with the second holder member 157 placed over the first holder member 156.

Holes 156*s* and 157*s* communicating with each other are formed in end portions on one side of the bases 156*a* and 157*a*, respectively, and holes 156*t* and 157*t* communicating with each other are formed in end portions on the other side of the bases 156*a* and 157*a*, respectively. The first holder member 156 and the second holder member 157 can be connected to each other by connecting the bases 156*a* and 157*a* to each other with a screw inserted through the holes 156*s* and 157*s* and with a screw inserted through the holes 156*t* and 157*t*. Alternatively, the first holder member 156 and the second holder member 157 may be connected to each other by bonding the bases 156*a* and 157*a* to each other. It is noted that a recess 156*r* is formed in the region of the base 156*a* where the hole 156*s* is formed.

In the thus configured holder member 155, when the first holder member 156 and the second holder member 157 are connected to each other, the slit 158 is formed between the light shielding protrusion 156*b* and light shielding protrusion 157*b*. The thus formed slit 158 angularly extends approximately 180 degrees, and the light receiving portion 151 of the light receiving device 150 is exposed through the slit 158. Since the light shielding protrusion 156*b* of the first holder member 156 has a fixed thickness, an inner surface 156*c* that is a surface of the light shielding protrusion 156*b* and faces the slit 158 is parallel to the central optical axis L150 of the light receiving device 150. In contrast, the light shielding protrusion 157*b* of the second holder member 157 having an outer surface and an inner surface 157*c* is configured in such a way that the outer surface, which faces away from the slit 158, is parallel to the central optical axis L150 of the light receiving device 150 but the inner surface 157*c*, which faces the slit 158, is tapered. As a result, the thickness to of the light shielding protrusion 157*b* at the central optical axis L150 is larger than the thickness tb of the light shielding protrusion 157*b* at a point angularly spaced apart from the central optical axis L150. The width of the slit 158 therefore increases as the angle with respect to the central optical axis L150 increases. That is, the width Ga of the slit 158 at the central optical axis L150 is narrower than the width Gb of the slit 158 at a point angularly spaced apart from the central optical axis L150. The change in the sensitivity f(Φ) of the light detector 15 described above is canceled out because the width of the slit 158 continuously increases from the value at the central optical axis L150 toward the values at both ends in the circumferential direction. For example, the width of the slit 158 in each angular position therealong is set to be a reciprocal of the sensitivity f(Φ). The width of the slit 158 may alternatively be increased stepwise from the value at the central optical axis L150 toward the values at both ends in the circumferential direction. It is noted that the light detector 15 is used only in a 60-degree range on each side, whereas the slit 158 is formed over a 90-degree range on each side.

In the thus configured light detector 15, using the light receiving device 150 alone causes the sensitivity f(Φ) to vary within a range of 1 to 0.50 in the angular range of 60 degrees on each side, whereas combining the light receiving device 150 with the holder member 155 allows the sensitivity f(Φ) to be fixed in the range of 60 degrees on each side because the opening through which light is incident on the light receiving device 150 at the central optical axis L150 thereof is narrower than the light incident opening at a point angularly spaced apart from the central optical axis L150. That is, the sensitivity f(Φ) of the light detector 15 is set to the value at the angle of 60 degrees shown in FIG. 4 (=0.50) over the entire range of 60 degrees on each side. Therefore, the sensitivity f(Φ) of the light detector 15 shown in FIGS. 5A and 5B is uniform over the high-sensitivity angular range of 60 degrees on each side.

A recess 156e is formed in a bottom portion of the first holder member 156 of the present embodiment, and a groove-shaped through hole 156g passing through the base 156a is formed in an end portion of the recess 156e. Further, a recess 156f is formed on the surface of the base 156a over which the second holder member 157 is placed, and the portion where the recess 156f is formed communicates with the groove-shaped through hole 156g. A recess 157f is formed in the portion of the second holder member 157 where the recess 157f is placed over the recess 156f. Further, the recess 157f is connected to the recess 157e, in which the light receiving device 150 is accommodated. As a result, when the light receiving device 150 is surface mounted on a flexible printed circuit (not shown), the holder member 155 shown in FIGS. 5A and 5B allows the flexible printed circuit to be taken out of the holder member 155 through the recesses 156f and 157f and the groove-shaped through hole 156g.

Primary Advantageous Effect Provided in Present Embodiment

As described above, in the optical position detection apparatus 10 and the display apparatus 100 with a position detection capability of the present embodiment, when the position detection light fluxes L2a to L2d exit through the light exiting surface 13s and are reflected off the object Ob placed on the light exiting side of the light guide plate 13, the reflected light is detected by the light detector 15. Since the intensities of the position detection light fluxes L2a to L2d in the detection region 10R show a predetermined correlation with the respective distances from the light sources 12A to 12D for position detection, the XY coordinates of the object Ob can be detected by using the intensities of the light fluxes received by the light detector 15. The detection method described above enables position detection without using a large number of light sources and light receiving devices. Further, it is only necessary to form intensity distributions of the position detection light fluxes in a space facing the one surface 220s of the screen member 220, and the light guide plate 13 is not necessarily disposed in front of the screen member 220. This configuration is suitable to form the display apparatus 100 with a position detection capability of the type in which an image is displayed on the screen member 220.

Further, in the present embodiment, the light detector 15 includes the holder member 155, which reduces the difference between the amount of incident light at the central optical axis of the light receiving device 150 and the amount of incident light at a point angularly spaced apart from the central optical axis L150. As a result, even when the light detector 15 has a directional characteristic of the sensitivity in the high-sensitivity angular range used with the light detector 15, such a directional characteristic of the sensitivity can be reduced by the holder member 155, whereby the precision in position detection can be increased. Further, in the present embodiment, the directional characteristic of the sensitivity of the light receiving device 150 is corrected by using the holder member 155 for incorporating the light receiving device 150 in the optical position detection apparatus 10. This approach is convenient to incorporate the light receiving device 150 in the optical position detection apparatus 10 and only requires a change in the configuration of the holder member 155 and hence a small amount of extra cost.

Further, the holder member 155 is formed of two holder members (first holder member 156 and second holder member 157) that make the opening through which light is incident on the light receiving device 150 at the central optical axis thereof narrower than the light incident opening at a point angularly spaced apart from the central optical axis. The simple configuration formed of the large and small light incident openings thus suppresses the directional characteristic of the sensitivity of the light detector 15 within an angular range used as a high-sensitivity angular range, whereby the precision in position detection can be increased. Moreover, the first holder member 156 and the second holder member 157 form the slit 158 as a light incident opening, which extends from the central optical axis of the light receiving device 150 toward both sides angularly spaced apart from the central optical axis. Changing the width of the slit continuously or stepwise therefore allows the directional characteristic of the sensitivity of the light detector 15 in the high-sensitivity angular range to be effectively canceled out, whereby the precision in position detection can be increased.

Further, since the light shielding protrusions 156b and 157b used as the first and second light shields are the semicircular portions of the first holder member 156 and the second holder member 157, the formation of the slit 158 (light incident opening) over an angular range including the direction in which the central optical axis L150 of the light receiving device 150 extends does not require increasing the size of the light shielding protrusions 156b and 157b. The size of the light detector 15 can therefore be reduced.

Example of Improved Light Detector 15

Figure 7A:
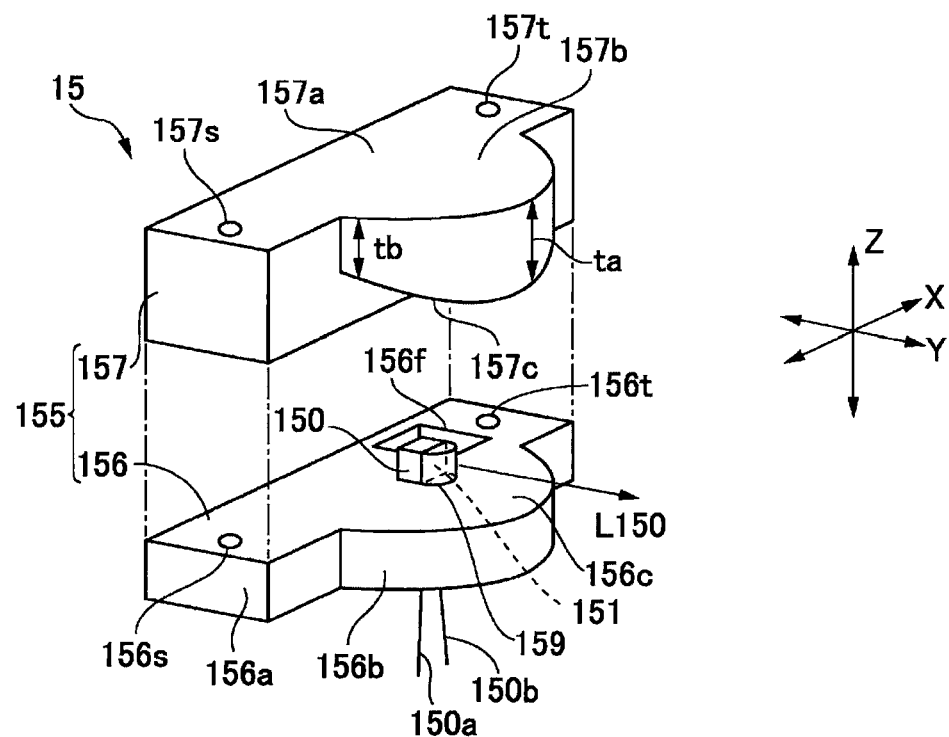
FIGS. 7A and 7B are descriptive diagrams for describing an example of an improved light detector used in the optical position detection apparatus to which the invention is applied.
Figure 7B:
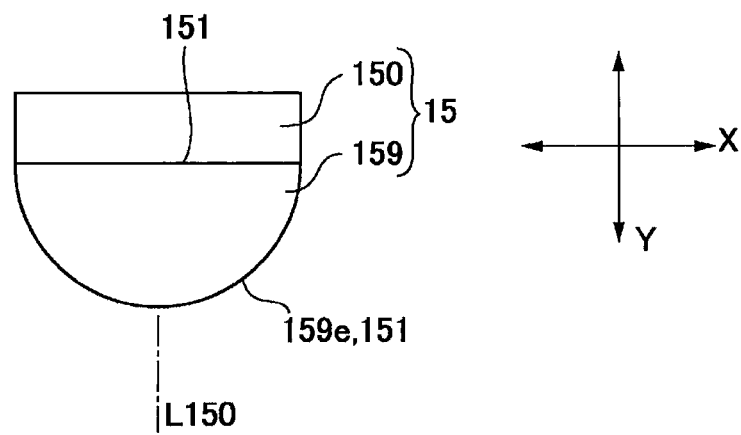

FIGS. 7A and 7B are descriptive diagrams for describing an example of an improved light detector 15 used in the optical position detection apparatus 10 to which the invention is applied. FIG. 7A is an exploded perspective view of the light detector 15 viewed obliquely downward, and FIG. 7B is a plan view of the light receiving device 150. The basic configuration of the light detector 15 of the present improvement is the same as the configuration described with reference to FIGS. 5A and 5B and FIGS. 6A and 6B. The common portions therefore have the same reference characters in FIGS. 7A and 7B, and no description of the common portions will be made.

As shown in FIGS. 7A and 7B, the light receiving device 150 is also held in the present embodiment by the holder member 155 formed of the first holder member 156 and the second holder member 157, as in the embodiment described above. The light detector 15 further includes a light-transmissive member 159 on the light incident side of the light receiving device 150, and the light-transmissive member 159 is a lens having a convex curved surface 159e facing forward when viewed in the Z-axis direction, as shown in FIGS. 7A and 7B. This configuration advantageously allows the light that enters the slit 158, which has been described with reference to FIGS. 5A and 5B, to be reliably guided to the light receiving device 150.

First Variation of Light Detector 15

Figure 8:
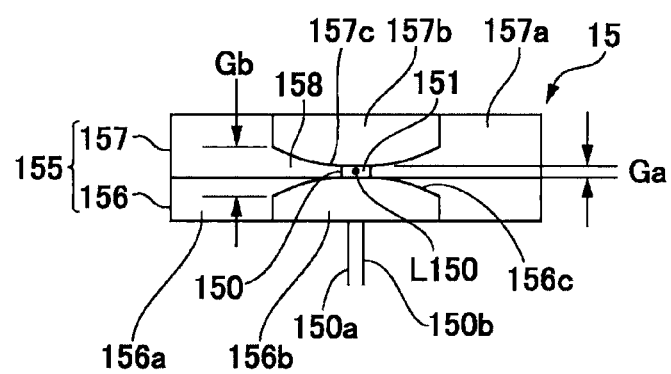
FIG. 8 is a front view of another light detector used in the optical position detection apparatus to which the invention is applied.

FIG. 8 is a front view of another example of the light detector 15 used in the optical position detection apparatus 10 to which the invention is applied. The basic configuration of the light detector 15 of the present variation is the same as the configuration described with reference to FIGS. 5A and 5B and FIGS. 6A and 6B. The common portions therefore have the same reference characters, and no description of the common portions will be made.

As shown in FIG. 8, the holder member 155 is used to increase the width of the slit 158 as the angle with respect to the central optical axis L150 increases also in the present variation. The holder member 155 in the present variation is configured in such a way that an inner surface 156c that is a surface of the first holder member 156 and faces the slit 158 and an inner surface 157c that is a surface of the second holder member 157 and faces the slit 158 are both tapered. As a result, the width of the slit 158 increases as the angle with respect to the central optical axis L150 increases. That is, the width Ga of the slit 158 at the central optical axis L150 is narrower than the width Gb of the slit 158 at a point angularly spaced apart from the central optical axis L150. The change in the sensitivity f(Φ) of the light detector 15 described above is canceled out because the width of the slit 158 continuously increases from the value at the central optical axis L150 toward the values at both ends in the circumferential direction. The other configurations are the same as those of the holder member 155, which has been described with reference to FIGS. 5A and 5B and FIGS. 6A and 6B, and no description of the same configurations will be made.

Second Variation of Light Detector 15

Figure 9A:
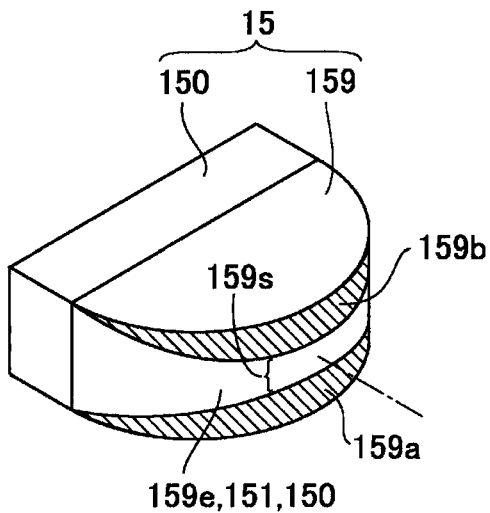
FIGS. 9A to 9C are descriptive diagrams for describing another light detector used in the optical position detection apparatus to which the invention is applied.
Figure 9B:
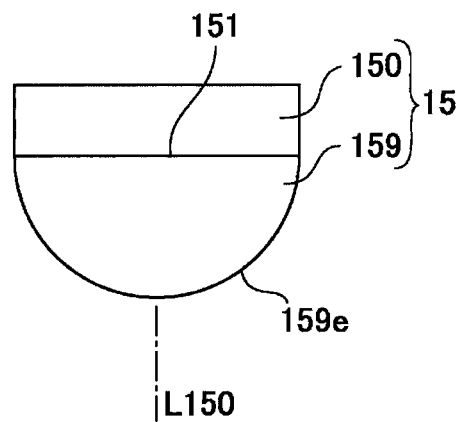
Figure 9C:
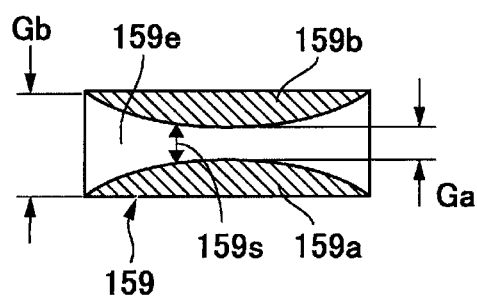

FIGS. 9A to 9C are descriptive diagrams for describing another example of the light detector 15 used in the optical position detection apparatus 10 to which the invention is applied. FIG. 9A is a perspective view of the light detector 15. FIG. 9B is a plan view of the light detector 15. FIG. 9C is a front view of the light detector 15.

As shown in FIGS. 9A to 9C, the light detector 15 of the present variation further includes a light-transmissive member 159 on the light incident side of the light receiving device 150. In the present embodiment, the light-transmissive member 159 is a lens having a convex curved surface 159e facing forward when viewed in the Z-axis direction. In the thus configured light detector 15, the convex curved surface 159e of the light-transmissive member 159 has a first black light shielding layer 159a (first light shield) provided on one side in the Z-axis direction, which is perpendicular to the central optical axis L150 of the light receiving device 150, with respect to the light receiving device 150, and a second black light shielding layer 159b (second light shield) on the other side in the Z-axis direction with respect to the light receiving device 150. As a result, a slit 159s (light incident opening) is formed between the first light shielding layer 159a and the second light shielding layer 159b over an angular range including the direction in which the central optical axis L150 of the light receiving device 150 extends.

Each of the first light shielding layer 159a and the second light shielding layer 159b has tapered end portions that face the slit 159s. The width of the slit 159s therefore increases as the angle with respect to the central optical axis L150 increases. That is, the width Ga of the slit 159s at the central optical axis L150 is narrower than the width Gb of the slit 158 at a point angularly spaced apart from the central optical axis L150. The change in the sensitivity f(Φ) of the light detector 15 described above is canceled out because the width of the slit 159s continuously increases from the value at the central optical axis L150 toward the values at both ends in the circumferential direction. For example, the width of the slit 159s in each angular position therealong is set to be a reciprocal of the sensitivity f(Φ). The width of the slit 159s may alternatively be increased stepwise from the value at the central optical axis L150 toward the values at both ends in the circumferential direction.

In the thus configured light detector 15 as well, the sensitivity f(Φ) is uniform over the high-sensitivity angular range of 60 degrees on each side. Further, since the light-transmissive member 159 functions as a collector lens, the amount of light incident on the light receiving device 150 increases. High sensitivity of the light detector 15 itself is therefore achieved, whereby the optical position detection apparatus 10 using the light detector 15 of the present variation shows high precision in position detection.

The thus configured light detector 15 can be directly incorporated in the optical position detection apparatus 10. The light detector 15 may alternatively be first incorporated in the holder member 155, which has been described with reference to FIGS. 5A and 5B and FIGS. 6A and 6B, and then incorporated in the optical position detection apparatus 10. In this case, the slit 158 formed in the holder member 155 may have a uniform width over the circumferential direction.

Figure 10A:
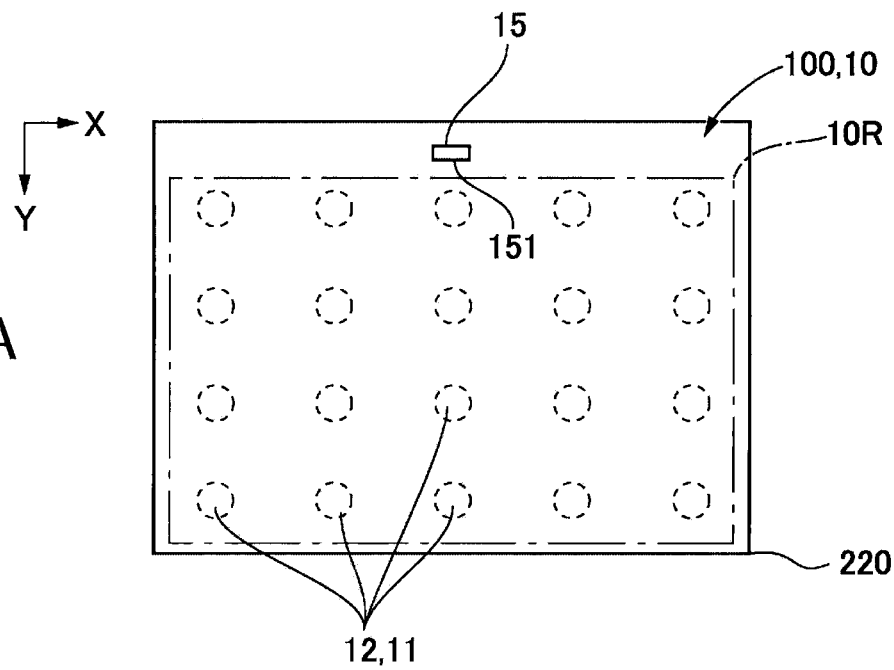
FIGS. 10A and 10B are descriptive diagrams for describing another light source apparatus for position detection used in the optical position detection apparatus to which the invention is applied.
Figure 10B:
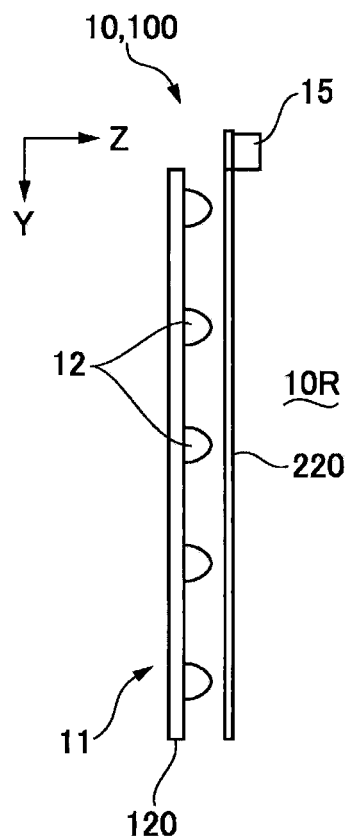

Configuration of Another Example of Light Source Apparatus 11 for Position Detection FIGS. 10A and 10B are descriptive diagrams for describing another example of the light source apparatus 11 for position detection used in the optical position detection apparatus 10 to which the invention is applied. In the embodiment described above, the light guide plate 13 is used in the light source apparatus 11 for position detection. The light source apparatus 11 for position detection may alternatively include no light guide plate but include a substrate 120 on which a plurality of light sources 12 for position detection are arranged, and the substrate 120 is disposed behind the screen member 220 in a position facing the detection region 10R in the Z-axis direction, as shown in FIGS. 10A and 10B.

In the configuration described above as well, intensity distributions of the position detection light fluxes for detecting the X coordinate position of the object Ob can be formed by turning on only part of the plurality of light sources 12 for position detection, that is, one side of light sources 12 spaced apart in the X direction. Similarly, intensity distributions of the position detection light fluxes for detecting the Y coordinate position of the object Ob can be formed by turning on only part of the plurality of light sources 12 for position detection, that is, one side of light sources 12 spaced apart in the Y direction.

Another Example of Layout of Light Detector 15

Figure 11:
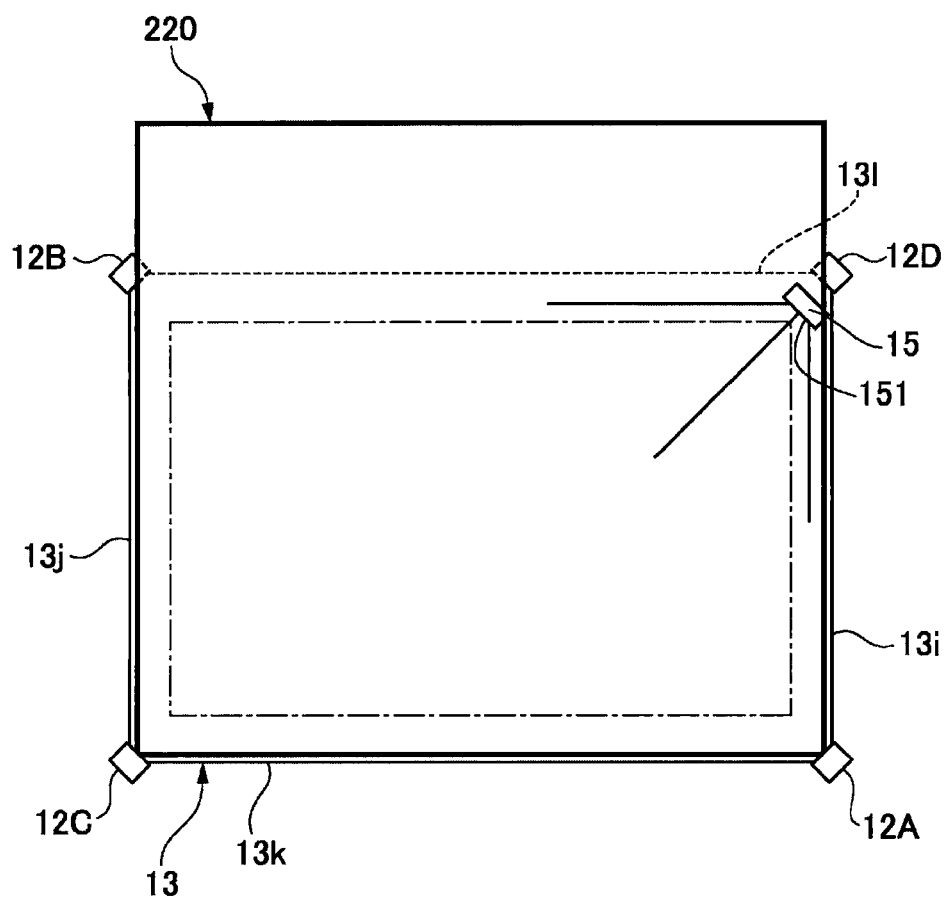
FIG. 11 is a descriptive diagram showing another layout of the light detector in the optical position detection apparatus to which the invention is applied.

FIG. 11 is a descriptive diagram showing another layout of the light detector 15 in the optical position detection apparatus 10 to which the invention is applied. In the embodiment described above, the light detector 15 is disposed in a side portion of the detection region 10R, but the light detector 15 may alternatively be disposed at a corner portion of the detection region 10R. According to the configuration described above, when the light detector 15 is disposed in the vicinity of the detection region 10R, the angular range of the light to be incident on the light detector 15 is 90 degrees. The size of the optical position detection apparatus 10 can be reduced by the amount of decrease in the distance between the light detector 15 and the detection region 10R.

Other Embodiments

Only one light detector 15 is used in the embodiment described above, but the invention may be applicable to a case where two or more light detectors 15 are used.

In the embodiment described above, the invention is applied to the screen member 220 having horizontally elongated shape. The invention may also be applied to a screen member 220 having vertically elongated shape. Further, in the embodiment described above, the light source apparatus 11 for position detection is disposed in a space facing the other surface 220t of the screen member 220. The light source apparatus 11 for position detection may alternatively be disposed in a space facing the one surface 220s of the screen member 220. Still alternatively, the light source apparatus for position detection may be disposed in the image projection apparatus 250.

In the embodiment described above, the invention is applied to the screen apparatus used in a projection display apparatus. The invention may also be applied to a screen apparatus used in an electronic blackboard.

The above embodiment has been described with reference to the light detector 15 used in the optical position detection apparatus 10. The invention may also be applied to the light detector 15 used in a monitor apparatus or any other apparatus other than the optical position detection apparatus 10.

Variations of Display Apparatus 100 with Position Detection Capability

In the embodiments described above, the display apparatus 100 with a position detection capability is used in a projection display apparatus or an electronic blackboard. The display apparatus 100 with a position detection capability can also be used in electronic apparatus that will be described later with reference to FIGS. 16A to 16C by using a direct-view display apparatus as the image generation apparatus 200, as shown in FIGS. 12 to 15.

First Variation of Display Apparatus 100 with Position Detection Capability

Figure 12:
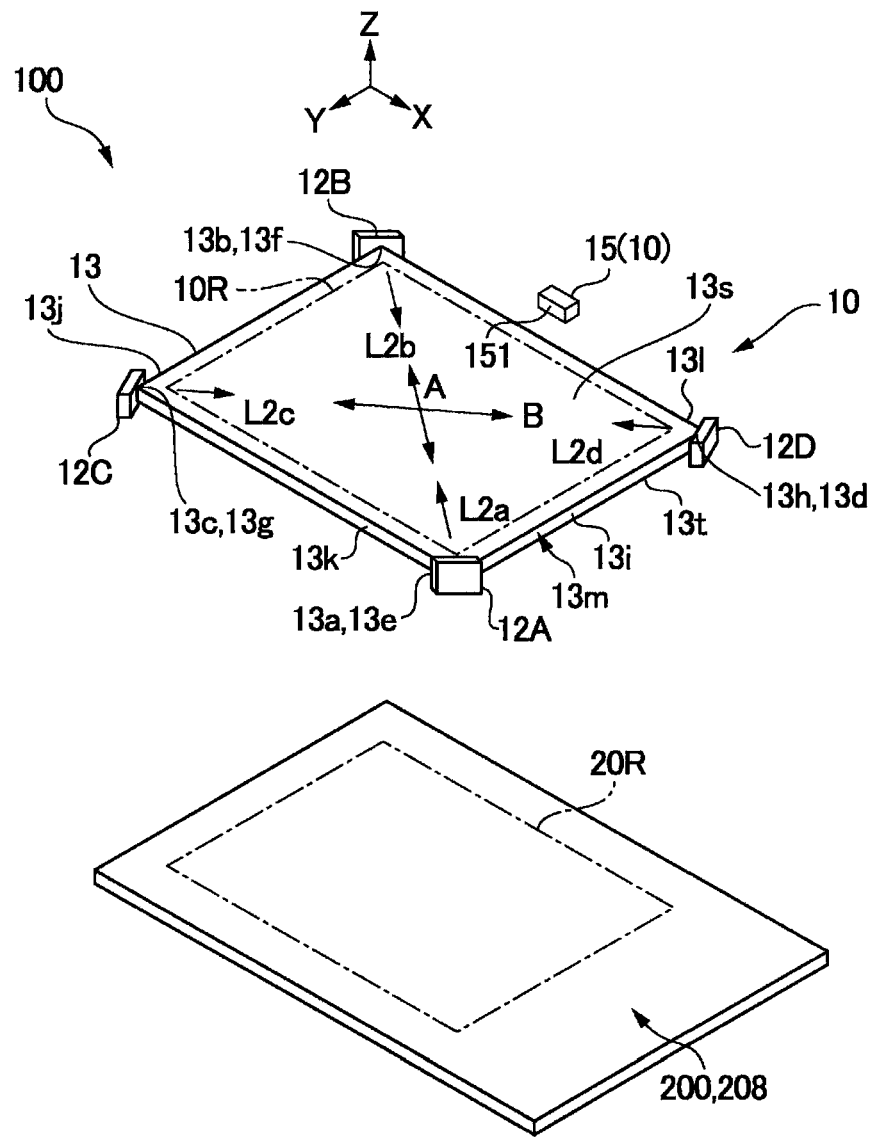
FIG. 12 is an exploded perspective view of an optical position detection apparatus and a display apparatus with a position detection capability according to a first variation of the invention.
Figure 13:
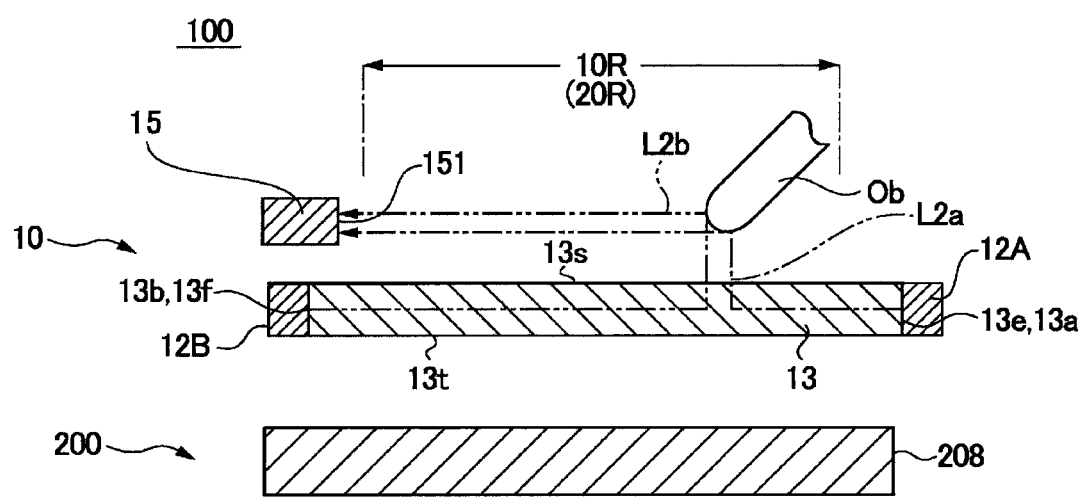
FIG. 13 is a descriptive diagram showing a cross-sectional configuration of the optical position detection apparatus and the display apparatus with a position detection capability according to the first variation of the invention.

FIG. 12 is an exploded perspective view of an optical position detection apparatus 10 and a display apparatus 100 with a position detection capability according to a first variation of the invention, and FIG. 13 is a descriptive diagram showing a cross-sectional configuration of the optical position detection apparatus 10 and the display apparatus 100 with a position detection capability. In the display apparatus 100 with a position detection capability of the present variation, the configuration of the optical position detection apparatus 10 is the same as those in the embodiments described above. The common portions therefore have the same reference characters, and no description of the common portions will be made.

The display apparatus 100 with a position detection capability shown in FIGS. 12 and 13 includes the optical position detection apparatus 10 and another example of the image generation apparatus 200, and the optical position detection apparatus 10 includes the light sources 12 for position detection, each of which emits position detection light, the light guide plate 13, and the light detector 15 having the light receiving portion 151 facing the detection region 10R. The image generation apparatus 200 is a direct-view display apparatus 208, such as an organic electroluminescence apparatus or a plasma display apparatus, and disposed on the opposite side of the optical position detection apparatus 10 to the input operation side. The direct-view display apparatus 208 has the image display region 20R in a region corresponding to the light guide plate 13 in a plan view, and the image display region 20R corresponds to the detection region 10R in a plan view.

Figure 14:
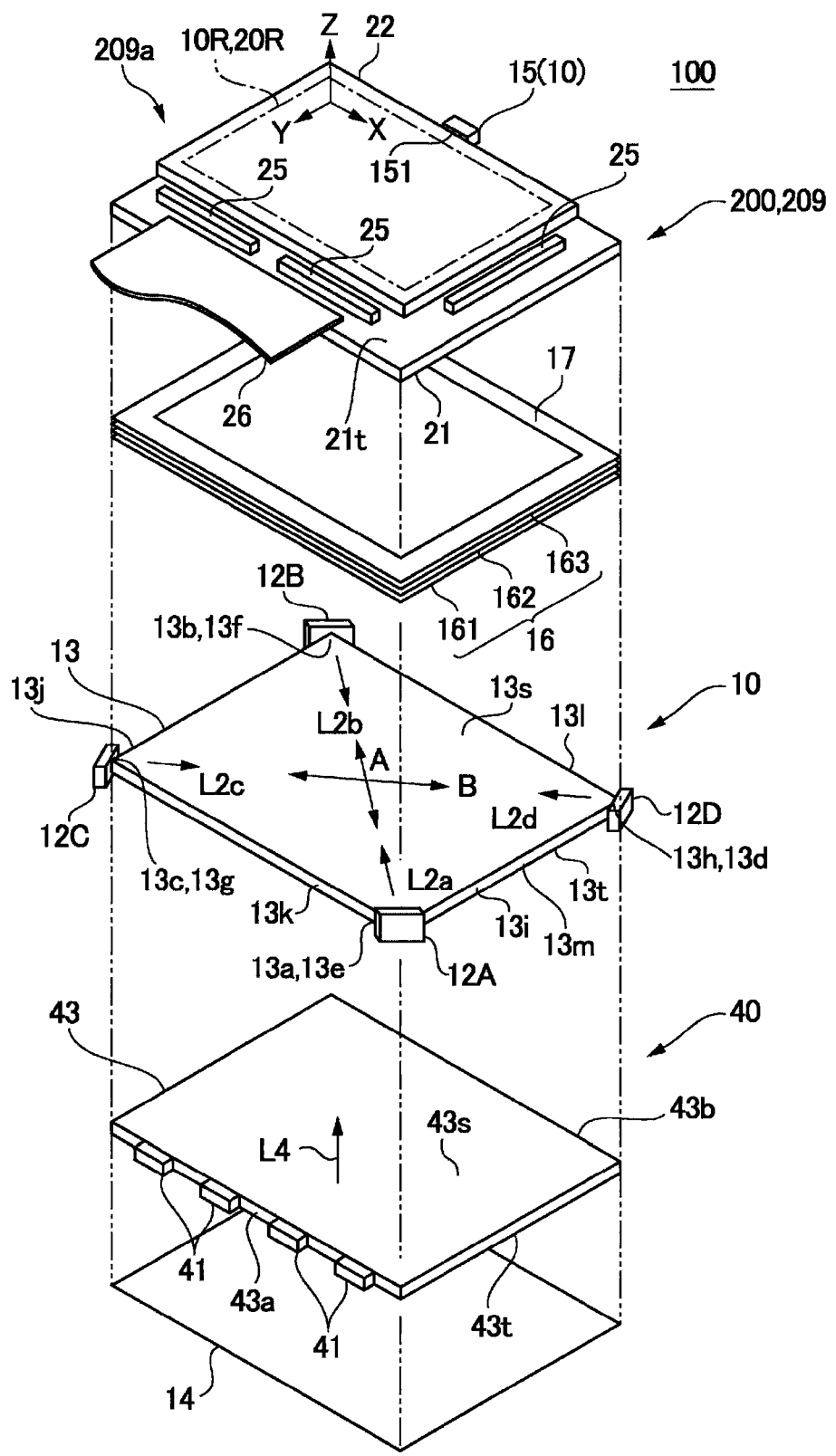
FIG. 14 is an exploded perspective view of an optical position detection apparatus and a display apparatus with a position detection capability according to a second variation of the invention.
Figure 15:
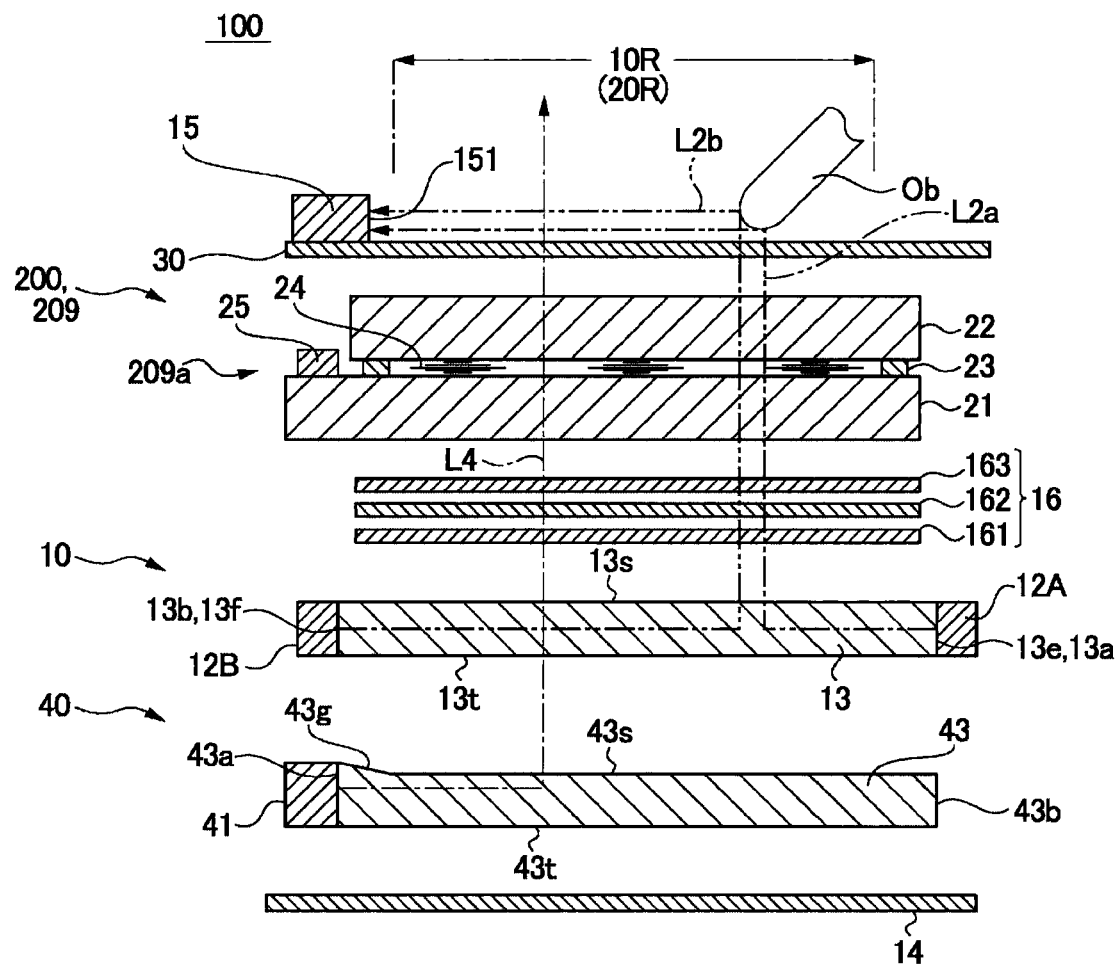
FIG. 15 is a descriptive diagram showing a cross-sectional configuration of the optical position detection apparatus and the display apparatus with a position detection capability according to the second variation of the invention.

Second Variation of Display Apparatus 100 with Position Detection Capability FIGS. 14 and 15 are descriptive diagrams of an optical position detection apparatus 10 and a display apparatus 100 with a position detection capability according to a second variation of the invention. FIG. 14 is an exploded perspective view of the optical position detection apparatus 10 and the display apparatus 100 with a position detection capability, and FIG. 15 is a descriptive view showing a cross-sectional configuration of the optical position detection apparatus 10 and the display apparatus 100 with a position detection capability. In the display apparatus 100 with a position detection capability of the present variation, the configuration of the optical position detection apparatus 10 is the same as those of the embodiments described above. The common portions therefore have the same reference characters, and no description of the common portions will be made.

The display apparatus 100 with a position detection capability shown in FIGS. 14 and 15 includes the optical position detection apparatus 10 and another example of the image generation apparatus 200, and the optical position detection apparatus 10 includes the light sources 12 for position detection, each of which emits position detection light, the light guide plate 13, and the light detector 15 having the light receiving portion 151 facing the detection region 10R. The image generation apparatus 200 includes a liquid crystal apparatus 209, which is a direct-view display apparatus, and a light-transmissive cover member 30. The liquid crystal apparatus 209 has the image display region 20R in an area corresponding to the light guide plate 13 in a plan view, and the image display region 20R corresponds to the detection region 10R in a plan view.

In the display apparatus 100 with a position detection capability of the present variation, an optical sheet 16 for homogenizing the position detection light fluxes L2a to L2d is disposed as required on the light exiting side of the light guide plate 13. In the present variation, the optical sheet 16 is formed of a first prism sheet 161 facing the light exiting surface 13s of the light guide plate 13, a second prism sheet 162 disposed on the opposite side of the first prism sheet 161 to the light guide plate 13 and facing the first prism sheet 161, and a light scattering plate 163 disposed on the opposite side of the second prism sheet 162 to the light guide plate 13 and facing the second prism sheet 162. A rectangular frame-shaped, light shielding sheet 17 disposed on the opposite side of the optical sheet 16 to the light guide plate 13 is disposed on the peripheral of the optical sheet 16. The light shielding sheet 17 prevents the position detection light fluxes L2a to L2d emitted from the light sources 12A to 12D for position detection from leaking.

The liquid crystal apparatus 209 (image generation apparatus 200) includes a liquid crystal panel 209a on the opposite side of the optical sheet 16 (first prism sheet 161, second prism sheet 162, and light scattering plate 163) to the light guide plate 13. In the present variation, the liquid crystal panel 209a is a transmissive liquid crystal panel having a structure in which liquid crystal molecules 24 are filled between two light-transmissive substrates 21 and 22 bonded to each other via a seal member 23. In the present variation, the liquid crystal panel 209a is an active-matrix liquid crystal panel. Light-transmissive pixel electrodes, data lines, scan lines, and pixel switching devices (not shown) are formed on one of the two light-transmissive substrates 21 and 22, and a light-transmissive common electrode (not shown) is formed on the other one of the two light-transmissive substrates 21 and 22. The pixel electrodes and the common electrode are alternatively formed on the same substrate in some cases. In the thus configured liquid crystal panel 209a, when scan signals are outputted through the scan lines to the pixels and image signals are outputted through the data lines, the orientation of the liquid crystal molecules 24 is controlled in each of the pixels. As a result, an image is formed in the image display region 20R.

In the liquid crystal panel 209a, the light-transmissive substrate 21, which is one of the two light-transmissive substrates, has a substrate overhang 21t that overhangs from the outer shape of the light-transmissive substrate 22, which is the other one of the two light-transmissive substrates. Electronic parts 25 that form a drive circuit and other circuits are mounted on the substrate overhang 21t. A wiring member 26, such as a flexible printed circuit (FPC), is connected to the substrate overhang 21t. Alternatively, only the wiring member 26 may be mounted on the substrate overhang 21t. A polarizer plate (not shown) is disposed as required on the outer side of each of the light-transmissive substrates 21 and 22.

To detect the in-plane position of the object Ob, it is necessary to output the position detection light fluxes L2a to L2d to the viewer's side where operation is carried out by the object Ob. To this end, the liquid crystal panel 209a is disposed in a position closer to the viewer's side (operator's side) than the light guide plate 13 and the optical sheet 16. In the liquid crystal panel 209a, the image display region 20R is therefore configured to transmit the position detection light fluxes L2a to L2d. When the liquid crystal panel 209a is disposed on the opposite side of the light guide plate 13 to the viewer's side, it is not necessary to configure the image display region 20R to transmit the position detection light fluxes L2a to L2d, but it is instead necessary to configure the image display region 20R to be viewable from the viewer's side through the light guide plate 13.

The liquid crystal apparatus 209 further includes an illumination apparatus 40 for illuminating the liquid crystal panel 209a. In the present variation, the illumination apparatus 40 is disposed on the opposite side of the light guide plate 13 to the liquid crystal panel 209a and between the light guide plate 13 and a reflection plate 14. The illumination apparatus 40 includes illumination light sources 41 and an illumination light guide plate 43 through which the illumination light fluxes emitted from the illumination light sources 41 propagate and exit. The illumination light guide plate 43 has a rectangular flat surface. Each of the illumination light sources 41 is formed of an LED (Light Emitting Diode) or any other suitable light emitting device and emits, for example, white illumination light L4 in response to a drive signal outputted from a drive circuit (not shown). In the present variation, the illumination light sources 41 are arranged along a side portion 43a of the illumination light guide plate 43.

A light-exiting-side surface of the illumination light guide plate 43 that is adjacent to the side portion 43a (a peripheral portion of the light exiting surface 43s that faces the side portion 43a) forms an inclined surface 43g, and the thickness thereof gradually increases toward the side portion 43a. The light introducing structure having the inclined surface 43g prevents the thickness of the portion where the light exiting surface 43s is provided from increasing and allows the height of the side portion 43a to match the height of a light emitting surface of each of the illumination light sources 41.

In the thus configured illumination apparatus 40, the illumination light fluxes emitted from the illumination light sources 41 pass through the side portion 43a of the illumination light guide plate 43, enter the interior of the illumination light guide plate 43, propagate through the interior of the illumination light guide plate 43 toward an outer edge portion 43b on the opposite side, and exit through the light exiting surface 43s, which is one of the surfaces of the illumination light guide plate 43. The illumination light guide plate 43 has a light guide structure that monotonously increases the ratio of the amount of light that exits through the light exiting surface 43s to the light propagating from the side portion 43a through the interior toward the outer edge portion 43b on the opposite side. The thus configured light guide structure is obtained, for example, by gradually increasing along the direction in which the light propagates through the interior described above the area of a refractive surface having light-deflecting or light-scattering minute irregularities and formed on the light exiting surface 43s or a rear surface 43t of the illumination light guide plate 43, or increasing along the light propagating direction the density at which a printed scattering layer is formed. Providing the thus configured light guide structure allows the illumination light L4 introduced through the side portion 43a to exit through the light exiting surface 43s in a substantially uniform manner.

In the present variation, the illumination light guide plate 43 is disposed on the opposite side of the liquid crystal panel 209a to the viewer's side and corresponds to the image display region 20R of the liquid crystal panel 209a in a plan view, whereby the illumination light guide plate 43 functions as what is called a backlight. Alternatively, the illumination light guide plate 43 may be disposed on the viewer's side of the liquid crystal panel 209a so that the illumination light guide plate 43 functions as what is called a front light. In the present variation, the illumination light guide plate 43 is disposed between the light guide plate 13 and the reflection plate 14, but may alternatively be disposed between the optical sheet 16 and the light guide plate 13. Further, the illumination light guide plate 43 and the light guide plate 13 may be integrated into a common light guide plate. In the present variation, the optical sheet 16 is shared by the position detection light L2a to L2d and the illumination light L4. Alternatively, a dedicated optical sheet separate from the optical sheet 16 described above may be disposed on the light exiting side of the illumination light guide plate 43. The reason for this is that a light scattering plate showing a sufficient light scattering effect is used with the illumination light guide plate 43 in many cases to homogenize the in-plane luminance of the illumination light L4 having exited through the light exiting surface 43s but significantly scattering the position detection light L2a to L2d having exited through the light exiting surface 13s hampers position detection in the light guide plate 13 for position detection. To address the problem, it is necessary to provide no light scattering plate or use a light scattering plate showing a relatively low light scattering effect with the light guide plate 13. The optical scattering plate is therefore preferably dedicated to the illumination light guide plate 43.

It is, however, noted that the prism sheets (first prism sheet 161 and second prism sheet 162) or any other light collectable optical sheet may be shared by the position detection light L2a to L2d and the illumination light L4.

Example of Incorporation into Electronic Apparatus

Figure 16A:
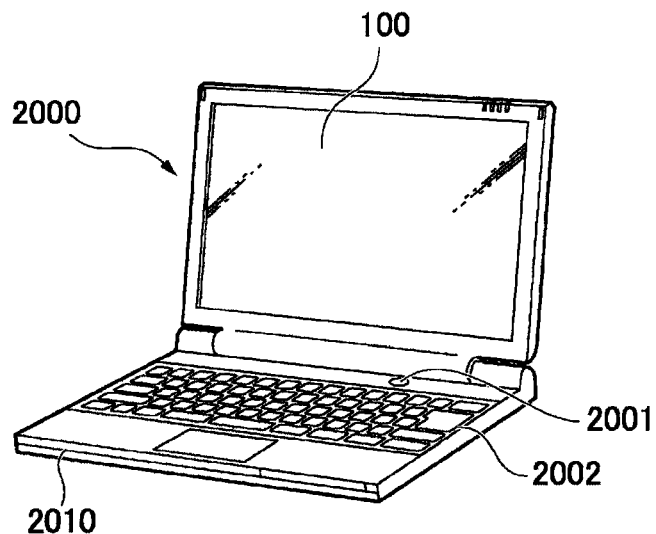
FIGS. 16A to 16C are descriptive diagrams of electronic apparatus using the display apparatus with a position detection capability according to the invention.
Figure 16B:
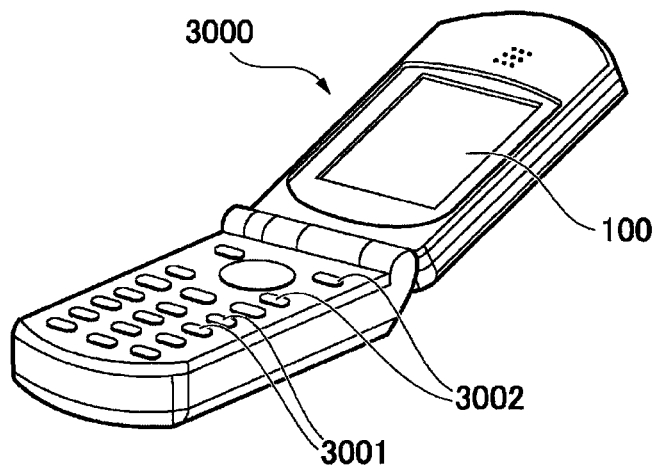
Figure 16C:
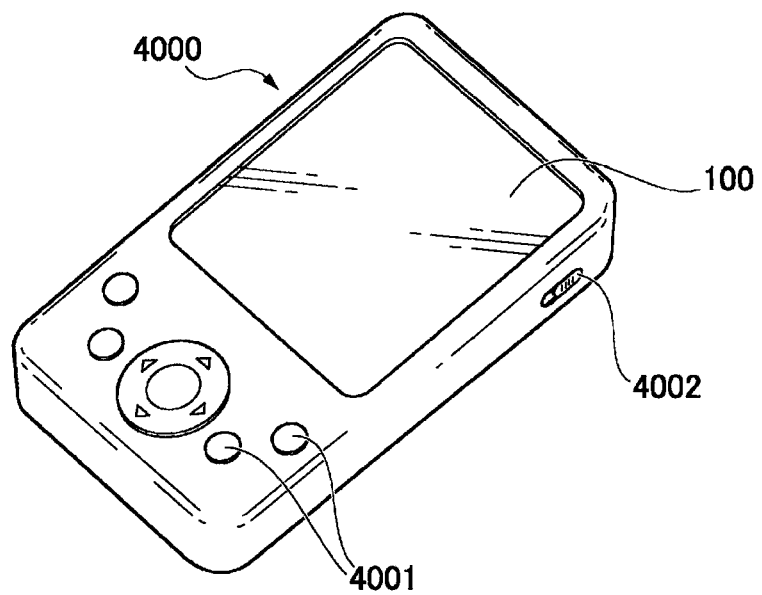

A description will be made, with reference to FIGS. 16A to 16C, of electronic apparatus using the display apparatus 100 with a position detection capability, which has been described with reference to FIGS. 12 to 15. FIGS. 16A to 16C are descriptive diagrams of electronic apparatus using the display apparatus with a position detection capability according to the invention. FIG. 16A shows the configuration of a mobile personal computer including the display apparatus 100 with a position detection capability. A personal computer 2000 includes the display apparatus 100 with a position detection capability as a display unit and a body 2010. The body 2010 includes a power source switch 2001 and a keyboard 2002. FIG. 16B shows the configuration of a mobile phone including the display apparatus 100 with a position detection capability. A mobile phone 3000 includes a plurality of operation buttons 3001, a scroll button 3002, and the display apparatus 100 with a position detection capability as a display unit. Operating the scroll button 3002 scrolls a screen displayed on the display apparatus 100 with a position detection capability. FIG. 16C shows the configuration of a personal digital assistant (PDA) using the display apparatus 100 with a position detection capability. A personal digital assistant 4000 includes a plurality of operation buttons 4001, a power source switch 4002, and the display apparatus 100 with a position detection capability as a display unit. When the power source switch 4002 is operated, an address book, a scheduler, and other variety of pieces of information are displayed on the display apparatus 100 with a position detection capability.

As electronic apparatus using the display apparatus 100 with a position detection capability, the following electronic apparatus are listed as well as those shown in FIGS. 16A to 16C: a digital still camera, a liquid crystal television, a viewfinder- or monitor-direct-view video camcorder, a car navigation system, a pager, an electronic personal organizer, an electric calculator, a word processor, a workstation, a videophone, a POS terminal, an automatic teller machine, and other apparatus. As a display section of the variety of electronic apparatus described above, the display apparatus 100 with a position detection capability described above can be used.

The entire disclosure of Japanese Patent Application No. 2009-235996, filed Oct. 13, 2009 is expressly incorporated by reference herein.

What is claimed is:

1. A light detector comprising:
a light receiving device that has a central optical axis and first and second directions perpendicular thereto, the light receiving device detecting incident light; and
a holder that includes first and second folder members that sandwich the light receiving device in the first direction, the first and second holder members include first and second bases and first and second light shields, respectively, wherein
the light receiving device has a directional characteristic of light sensitivity in which a first position located along the optical axis has a highest sensitivity and a second position angled from the first position in the second direction has a low sensitivity, and the sensitivity lowers and the angle becomes larger,
each of the first and second bases has a rectangular shape in which longitudinal sides extend in the second direction, a first thickness of the first base is larger than a second thickness of the second base, the light receiving device is provided on the second base next to the longitudinal side of the second base, and a portion of the longitudinal side of the first base that corresponds to the light receiving device has a recess that opens the central optical axis of the light receiving device toward a light incident side,
the first and second light shields continuously and respectively project from the longitudinal sides of the first and second bases toward the light incident side, each of the first and second light shields has a semi-circular shape, a third thickness of the first light shield is smaller than the first thickness so that the light receiving device detects the incident light, and a fourth thickness of the second light shield is the same as the second thickness, and
top surfaces of the first base and the first light shield are co-planar, the third thickness gradually decreases from a first tip closest to the light incident side of the first light shield toward ends of the first light shield connected to the first base, and the light receiving device receives the incident light that passes through a gap between the first and second light shields.

2. The light detector according to claim 1, wherein the holder is made of a light shielding material.

3. The light detector according to claim 1, wherein
the first light shield, when viewed in the first direction, protrudes from the first base and has the semi-circular shape whose center is located on the side where the light receiving device is present, and
the second light shield, when viewed in the first direction, protrudes from the second base and has the semi-circular shape whose center is located on the side where the light receiving device is present.

4. The light detector according to claim 1, further comprising:
a lens on the light incident side of the light receiving device, the lens having a convex curved surface facing forward when viewed in the first direction.

5. The light detector according to claim 1, further comprising:
a light-transmissive member on the light incident side of the light receiving device, wherein
each of the first and second light shields is a light shielding layer formed on the light-transmissive member.

6. The light detector according to claim 5, wherein the light-transmissive member is a lens having a convex curved surface facing forward when viewed in the first direction.

7. The light detector according to claim 1, wherein the light receiving device detects at least infrared light.

8. An optical position detection apparatus that optically detects a position of an object in a detection region, the optical position detection apparatus comprising:
the light detector according to claim 7;
a light source apparatus for position detection that emits infrared position detection light toward the detection region to form an intensity distribution of the position detection light in the detection region; and
a position detector that detects the position of the object, wherein
the light detector has a light receiving portion facing the detection region,
the light receiving portion receives the position detection light reflected off the object in the detection region, and
the position detector detects the position of the object based on the light received by the light detector.

9. A display apparatus with a position detection capability comprising:
the optical position detection apparatus according to claim 8; and
an image generation apparatus that forms an image in a region corresponding to the detection region.

* * * * *